(12) United States Patent
McHenry et al.

(10) Patent No.: US 9,928,244 B2
(45) Date of Patent: *Mar. 27, 2018

(54) ELECTRONIC DOCUMENT CLASSIFICATION

(71) Applicant: Integro, Inc., Englewood, CO (US)

(72) Inventors: Christopher A. McHenry, Littleton, CO (US); Scott W. Burt, Parker, CO (US)

(73) Assignee: INTEGRO, INC., Littleton, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/192,386

(22) Filed: Jun. 24, 2016

(65) Prior Publication Data

US 2016/0306812 A1    Oct. 20, 2016

Related U.S. Application Data

(63) Continuation-in-part of application No. 14/291,742, filed on May 30, 2014, now Pat. No. 9,378,265, which is a continuation of application No. 12/781,939, filed on May 18, 2010, now Pat. No. 8,745,091.

(51) Int. Cl.
*G06F 17/30* (2006.01)
*H04L 12/58* (2006.01)
*G06Q 10/10* (2012.01)

(52) U.S. Cl.
CPC ........ *G06F 17/30085* (2013.01); *G06F 17/30* (2013.01); *G06F 17/30011* (2013.01); *G06F 17/3071* (2013.01); *G06F 17/30598* (2013.01); *G06F 17/30684* (2013.01); *G06F 17/30705* (2013.01); *G06Q 10/10* (2013.01); *H04L 51/22* (2013.01); *H04L 51/26* (2013.01)

(58) Field of Classification Search
CPC .............. G06F 17/30; G06F 17/30604; G06F 17/3064; G06F 17/30702; G06F 17/30085; G06F 17/30011; G06F 17/30598
USPC .................................................. 707/600–899
See application file for complete search history.

(56) References Cited

U.S. PATENT DOCUMENTS

| | | |
|---|---|---|
| 6,553,365 B1 | 4/2003 | Summerlin et al. |
| 6,592,627 B1 | 7/2003 | Argrawal et al. |
| 6,678,694 B1 | 1/2004 | Zimmerman et al. |

(Continued)

OTHER PUBLICATIONS

Burt, Scott, "The Art of Email Management," Whitepaper, Aug. 2010, 9 pages.

*Primary Examiner* — Isaac M Woo
(74) *Attorney, Agent, or Firm* — Holzer Patel Drennan

(57) ABSTRACT

An electronic document classification system disclosed herein classifies electronic documents. The classification of the documents may involve analyzing the document and the information attached to the document to generate a set of classification data and comparing the classification data with one or more classification rules to generate a set of classifying data. The system attaches the set of classifying data to the electronic document and displays the electronic document based on the set of classifying data. The classification data may also be used to prioritize the electronic documents and to assign a retention period to the electronic documents. The system is further adapted to receive user feedback regarding the classification of the electronic document and to update the classification rules.

29 Claims, 15 Drawing Sheets

(56) References Cited

U.S. PATENT DOCUMENTS

| | | |
|---|---|---|
| 6,832,244 B1 | 12/2004 | Raghunandan |
| 7,930,309 B2 | 4/2011 | Nagao |
| 8,645,367 B1 | 2/2014 | Hajaj et al. |
| 2001/0042087 A1 | 11/2001 | Kephart et al. |
| 2005/0228774 A1 | 10/2005 | Ronnewinkel |
| 2006/0085504 A1 | 4/2006 | Yang et al. |
| 2008/0109448 A1 | 5/2008 | Aboel-Nil et al. |
| 2008/0140684 A1 | 6/2008 | O'Reilly et al. |
| 2008/0144372 A1 | 6/2008 | Massey et al. |
| 2008/0162384 A1 | 7/2008 | Kleist |
| 2009/0300482 A1* | 12/2009 | Summers ............ G06F 17/2705 715/234 |

* cited by examiner

FIG. 8

ELECTRONIC DOCUMENT CLASSIFICATION

CROSS-REFERENCE TO RELATED APPLICATIONS

The present application claims benefit of priority to U.S. patent application Ser. No. 14/291,742, issued as U.S. Pat. No. 9,378,265, entitled "Electronic Document Classification" and filed on May 30, 2014, which further claims priority to U.S. patent application Ser. No. 12/781,939 entitled "Electronic Document Classification" and issued as U.S. Pat. No. 8,745,091 filed on May 18, 2010, which are incorporated by reference herein in their entirety.

BACKGROUND

In this age of computers and the Internet, organizations and individuals are incessantly inundated by a plethora of information. For organizations, much of the information is communicated in the form of electronic mail (referred to herein as "e-mail" or "email"). Since its introduction as a form of communication, emails have become one of the most preferred methods of communication, often preferred over phone calls, meetings, etc. As a result, a significant portion of an employee's workday is spent in reading, writing, and organizing emails.

The increased use of email also means that more and more information, of all types, is communicated and memorialized in the form of emails. This makes email an important part of electronic documents for organizations, requiring organizations and employees to pay more attention to policies and procedures related to archival of emails. As email systems continue to grow, more and more companies are turning their attention to email management. Moreover, legal departments are increasingly focused on e-discovery, record managers want email records under control, and management experts want emails to be compliant with industry and other regulations. This is especially true in view of various new regulations, such as the Sarbanes-Oxley Act, which mandates specified levels of document management and archival by companies. Furthermore, electronic documentation discovery has become an increasingly important part of lawsuits, as exemplified by the increasing number of legal cases being determined based on information communicated over emails. This adds additional pressure on organizations to come up with a coherent and comprehensive email management policy.

Organizations have generally reacted to such needs in one of two manners. Some organization end up with an over-reactive electronic document retention policy that requires keeping all electronic documents, including all emails, for a long time, sometimes forever. In such a case, every single piece of email, including emails between employees and their friends and families, etc., end up being stored as part of archive. Such overly cautious document retention policy results in email inboxes and archival systems becoming too large. Furthermore, it becomes overly costly and time consuming to find any relevant information from such "save everything" document archive.

On the other hand, various other organizations implement a policy that mandates employees to remove most of the emails, at least from their in-boxes. Generally, under such policies, companies set quotas in the form of size of email that can be saved in in-boxes, often at several megabytes (MBs). Such an overly strict "save nothing" type of email management policies often result in inconvenience to employees as they have to constantly keep cleaning their email in-boxes. Moreover, as employees are forced to constantly clean out their emails, they often end up deleting emails without reading or deleting emails that are important for the organizations. As expected, such policies often end up being counterproductive and may cause problems at a later stage when it becomes almost impossible to find information that is important to organizations and their employees.

Thus, there is a need for a method and system that assists organizations and employees in managing their emails in an efficient and effective manner.

SUMMARY

The disclosed invention overcomes the problems and limitations with an electronic document classification system for classifying electronic documents. The classification of the documents may involve analyzing the document and the information attached to the document to generate a set of classification data and comparing the classification data with one or more classification rules to generate a set of classifying data. The system attaches the set of classifying data to the electronic document and displays the electronic document based on the set of classifying data. The classification data may also be used to prioritize the electronic documents and to assign a retention period to the electronic documents. The system is further adapted to receive user feedback regarding the classification of the electronic document and to update the classification rules.

An embodiment of the present invention provides a method for analyzing an electronic document to generate document identifying data, classifying the electronic document in one or more categories by applying a classification rule to the document identifying data, and displaying the classified electronic document in the one or more categories, and updating the classification rule based on input from a user. In an alternate embodiment of the present invention, the electronic documents to be classified are emails. A yet alternate embodiment of the present invention further provides for displaying the classified electronic document in an email inbox of the user.

In an embodiment of the present invention, the classification of the electronic document represents a prioritization of the electronic document. The classification rule may be developed based on an analysis of electronic documents by an expert group.

In an alternate embodiment, the classification rule may be developed using a suggestive file plan classification of a number of electronic document files from an expert group. The classification rule may also be developed based on analysis of electronic documents by an end user.

In an embodiment of the present invention, classifying the electronic document further comprises using one of natural language processing and semantic analysis of a relationship modeling engine to provide suggestive classification for the electronic document. In yet another embodiment of the present invention, analyzing the electronic document includes analyzing at least one of (i) an electronic document recipient's address, (ii) metadata attached to the electronic document, (iii) a title of the electronic document, (iv) content attached to the electronic document, and (v) content of the electronic document.

In an embodiment of the present invention, analyzing the electronic document further comprises analyzing the document using statistical or semantical analysis of the document. An embodiment of the present invention further comprises prioritizing the electronic document based on the document identified data. Such prioritizing the electronic document may be based on the category of the document.

In an embodiment of the present invention, the electronic document identifying data includes a confidence level representative of a priority level of the electronic document. Various embodiments of the present invention may also comprise assigning a retention level to the electronic document based on the classification of the electronic document and assigning an auto-deletion time to the electronic document based on the classification of the electronic document. Such an alternate embodiment of the present invention may further comprise determining, on a periodic basis, if the electronic document is to be deleted and providing a message to a user if the electronic document is to be deleted.

Yet alternate embodiment of the present invention may further comprise developing the classification rule based on a personal knowledge base of a recipient of the electronic document and a collective knowledge base of an organization, wherein the recipient is a member of the organization. In yet alternate embodiment, the classification rule may be developed based on a community knowledge base, wherein the organization is related to the community. Yet alternatively, classifying the electronic document may further comprises classifying the electronic document one of (i) a potential corporate record category; (ii) a classified document category; and (iii) an optional reading category.

An alternate embodiment may further comprise, if the electronic document is classified in a first category, storing the electronic document in an archive and assigning a first retention period to the electronic document and generating a convenience copy of the electronic document and assigning a second retention period to the convenience copy wherein the second retention period is smaller than the first retention period. Yet alternate embodiment of the present invention may further comprise assigning workspace quota to each of the one or more categories.

In yet another embodiment of the present invention, receiving an input from a user may further comprise receiving a request to reclassify the electronic document.

Alternatively, receiving an input from a user may further comprise the user ignoring the electronic document.

An alternate embodiment of the present invention provides a computer system comprising a computer program, said computer program stored in a memory and operable to cause a processor to analyze an electronic document to generate document identifying data; classify the electronic document in one or more categories by applying one of natural language processing and semantic analysis to the document identifying data to provide suggestive classification; display the classified electronic document in the one or more categories; receive an input from a user regarding the classification of the electronic document; and update the classification rule based on the user input. Said computer program may be further operable to cause the processor to display the classified electronic document in an email inbox of the user.

In an alternate embodiment, said computer program may be further operable to assign a retention level or an auto-deletion time to the electronic document based on the classification of the electronic document. Alternatively, the computer program may be further operable to determine whether the electronic document is to be deleted based on the retention level or the auto-deletion time assigned to the electronic document. The one or more categories may comprise (i) a high importance document category; (ii) a low importance document category; and (iii) optional reading documents category.

An alternate embodiment of the present invention provides one or more computer-readable storage media encoding computer-executable instructions for executing on a computer system a computer process for classifying electronic documents, the computer process comprising: analyzing an electronic document to generate document identifying data; classifying the electronic document in one or more categories by applying a suggestive classification rule to the document identifying data; receiving an input from a user regarding the classification of the electronic document; and updating the classification rule based on input from a user.

In an alternate embodiment, the computer process may further comprise displaying the classified electronic document in the one or more categories and analyzing the electronic document further comprises analyzing metadata attached to the electronic document. In yet alternate embodiment, the computer process may further comprise assigning an auto-deletion period to the electronic document based on the document identifying data and deleting the electronic document if the auto-deletion period has expired. Yet alternatively, classifying the electronic document may further comprise associating a series of concepts to the electronic documents and pattern matching the concepts associated with the electronic documents with concepts identified in a knowledge base.

In an alternate embodiment, a user interface is provided, the user interface comprising a display of a first listing of electronic documents, the first listing of electronic documents comprising the electronic documents grouped under a plurality of categories, wherein the electronic documents are assigned to the plurality of categories by (i) analyzing the electronic document to generate document identifying data for each of the electronic documents; and (ii) classifying the electronic document in the one or more categories by applying a classification rule to the document identifying data. The user interface may also include a second listing of a workspace usage summary identifying (i) workspace quotas assigned to one of the one or more categories; and (ii) workspace utilized for the one of the one or more categories and a third listing of one or more options, wherein a user may select the one or more option to reclassify one of the electronic documents.

A yet alternate embodiment of the present invention may provide computer software encoded on one or more computer-readable media, executable on a computer processor, and configured to suggestively classify an electronic document in one or more categories by applying a classification rule to a series of concepts associated with the electronic document. The computer software may be further configured to reclassify the electronic document using a user input regarding the suggestive classification.

Other implementations are also described and recited herein.

BRIEF DESCRIPTION OF DRAWINGS

A further understanding of the nature and advantages of the present invention may be realized by reference to the figures, which are described in the remaining portion of the specification. In the figures, like reference numerals are used throughout several figures to refer to similar components. In some instances, a reference numeral may have an associated sub-label consisting of a lower-case letter to denote one of multiple similar components. When reference is made to a reference numeral without specification of a sub-label, the reference is intended to refer to all such multiple similar components.

FIGS. 8-10 illustrate various views of graphical user interface output generated by the system disclosed herein.

DETAILED DESCRIPTION

Figure 1:
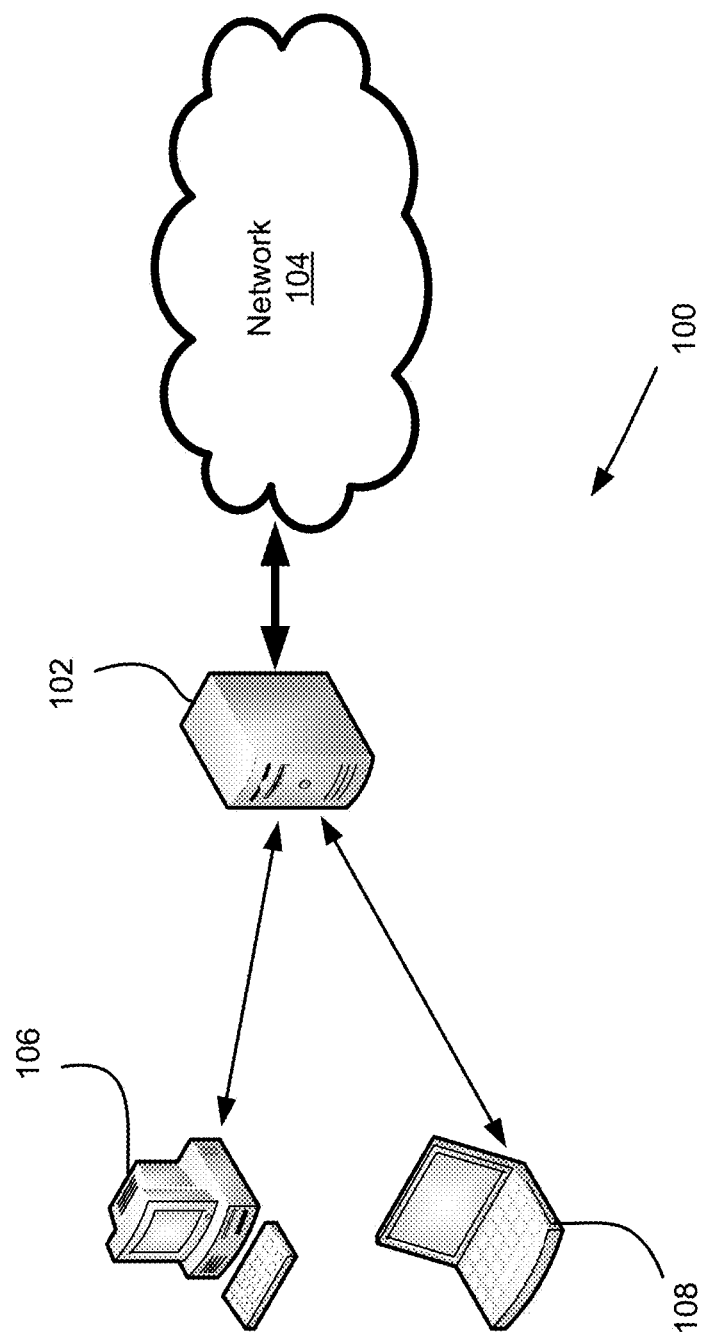
FIG. 1 illustrates an embodiment of an electronic document classification system disclosed herein.

Embodiments of the present invention are disclosed herein in the context of an electronic document management system. In the following description, for the purposes of explanation, numerous specific details are set forth in order to provide a thorough understanding of the present invention. It will be apparent, however, to one skilled in the art that the present invention may be practiced without some of these specific details. For example, while various features are ascribed to particular embodiments, it should be appreciated that the features described with respect to one embodiment may be incorporated with other embodiments as well. By the same token, however, no single feature or features of any described embodiment should be considered essential to the invention, as other embodiments of the invention may omit such features.

In the interest of clarity, not all of the routine functions of the implementations described herein are shown and described. It will, of course, be appreciated that in the development of any such actual implementation, numerous implementation-specific decisions must be made in order to achieve the developer's specific goals, such as compliance with application—and business-related constraints, and that those specific goals will vary from one implementation to another and from one developer to another.

According to one embodiment of the present invention, the components, process steps, and/or data structures disclosed herein may be implemented using various types of operating systems (OS), computing platforms, firmware, computer programs, computer languages, and/or general-purpose machines. The method can be run as a programmed process running on processing circuitry. The processing circuitry can take the form of numerous combinations of processors and operating systems, connections and networks, data stores, or a stand-alone device. The process can be implemented as instructions executed by such hardware, hardware alone, or any combination thereof. The software may be stored on a program storage device readable by a machine.

According to one embodiment of the present invention, the components, processes and/or data structures may be implemented using machine language, assembler, C or C++, Java and/or other high level language programs running on a data processing computer such as a personal computer, workstation computer, mainframe computer, or high performance server running an OS such as Solaris® available from Sun Microsystems, Inc. of Santa Clara, Calif., Windows Vista™, Windows NT®, Windows XP PRO, and Windows® 2000, available from Microsoft Corporation of Redmond, Wash., Apple OS X-based systems, available from Apple Inc. of Cupertino, Calif., or various versions of the Unix operating system such as Linux available from a number of vendors. The method may also be implemented on a multiple-processor system, or in a computing environment including various peripherals such as input devices, output devices, displays, pointing devices, memories, storage devices, media interfaces for transferring data to and from the processor(s), and the like. In addition, such a computer system or computing environment may be networked locally, or over the Internet or other networks. Different implementations may be used and may include other types of operating systems, computing platforms, computer programs, firmware, computer languages and/or general purpose machines; and. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

In the context of the present invention, the term "processor" describes a physical computer (either stand-alone or distributed) or a virtual machine (either stand-alone or distributed) that processes or transforms data. The processor may be implemented in hardware, software, firmware, or a combination thereof.

In the context of the present invention, the term "data store" describes a hardware and/or software means or apparatus, either local or distributed, for storing digital or analog information or data. The term "Data store" describes, by way of example, any such devices as random access memory (RAM), read-only memory (ROM), dynamic random access memory (DRAM), static dynamic random access memory (SDRAM), Flash memory, hard drives, disk drives, floppy drives, tape drives, CD drives, DVD drives, magnetic tape devices (audio, visual, analog, digital, or a combination thereof), optical storage devices, electrically erasable programmable read-only memory (EEPROM), solid state memory devices and Universal Serial Bus (USB) storage devices, and the like. The term "Data store" also describes, by way of example, databases, file systems, record systems, object oriented databases, relational databases, SQL databases, audit trails and logs, program memory, cache and buffers, and the like.

Reference will now be made in detail to implementations of the present invention as illustrated in the accompanying drawings and the following detailed description to refer to the same or like parts.

FIG. 1 illustrates an embodiment of a document management system 100 wherein an email server 102 may be communicatively connected to a network 104, such as the Internet, and with one or more client computers 106, 108. The email server 102 may receive an email from the network 104 and forward such an email based on the addressee information in the email to one of the target client, such as one of the computers 106, 108. Similarly, the client at computer 106, 108 may send email to a recipient that may be connected to the network 104 via the server 102. The email server 102 may include an electronic document classification module to classify emails and to send the classified emails to the client computers. In an alternate embodiment, the client computers may also include an electronic document classification module to classify emails and to display the classified emails to a user.

Figure 2:
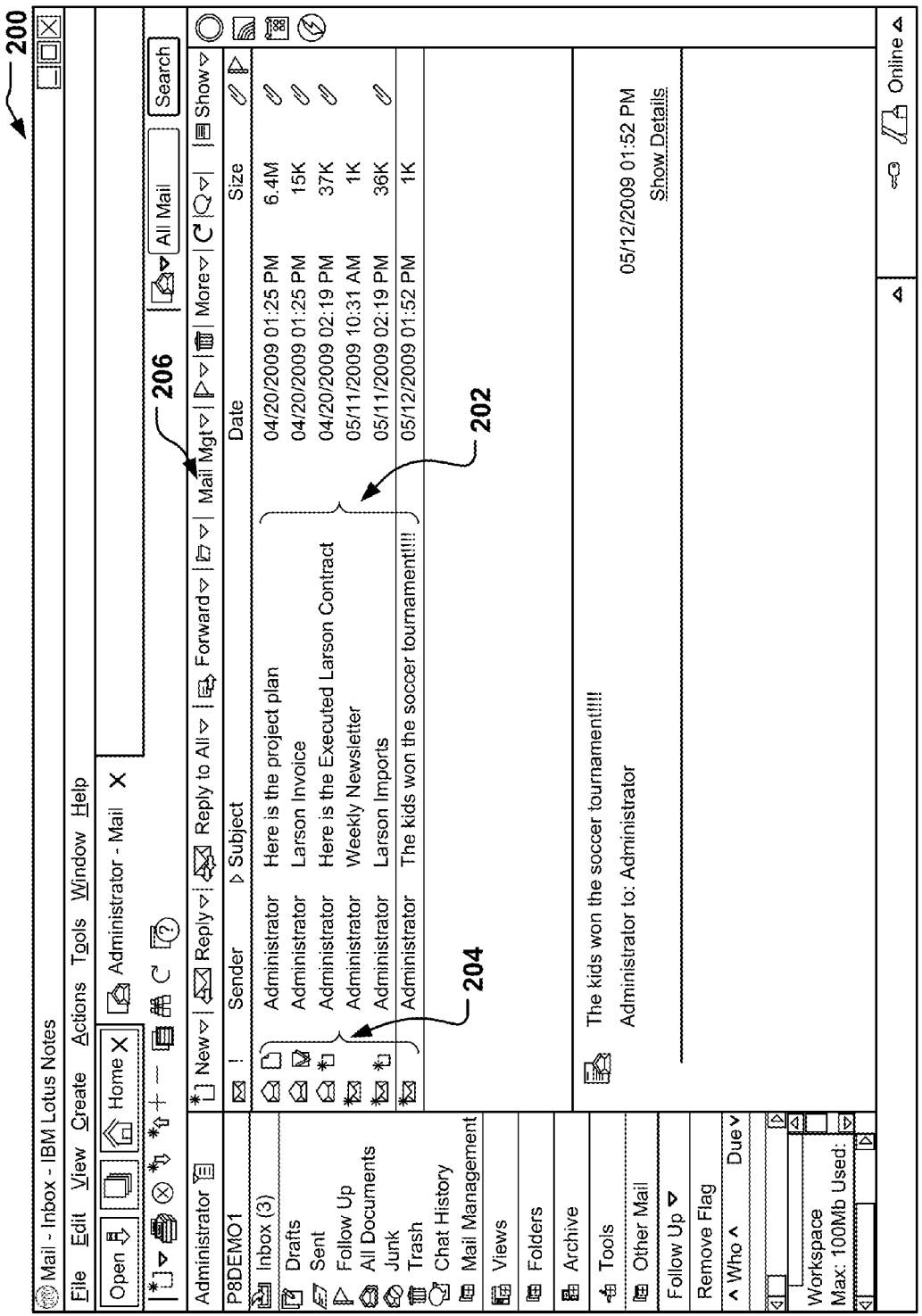
FIG. 2 illustrates a display of emails to a client.

FIG. 2 illustrates a screenshot 200 that may be generated by the document management system 100 showing various emails 202 received by a client computer 106, 108. As shown in FIG. 2, all of the emails 202 received by the client may be listed chronologically or sequentially. The screenshot 200 shows a number of different icons 204 assigned to the emails 202, wherein each icon illustrates a classification of an email. The screenshot 200 also shows a button for mail management 206 that can be used by a user to select various display options. Such display option will be discussed in further detail below.

Figure 3:
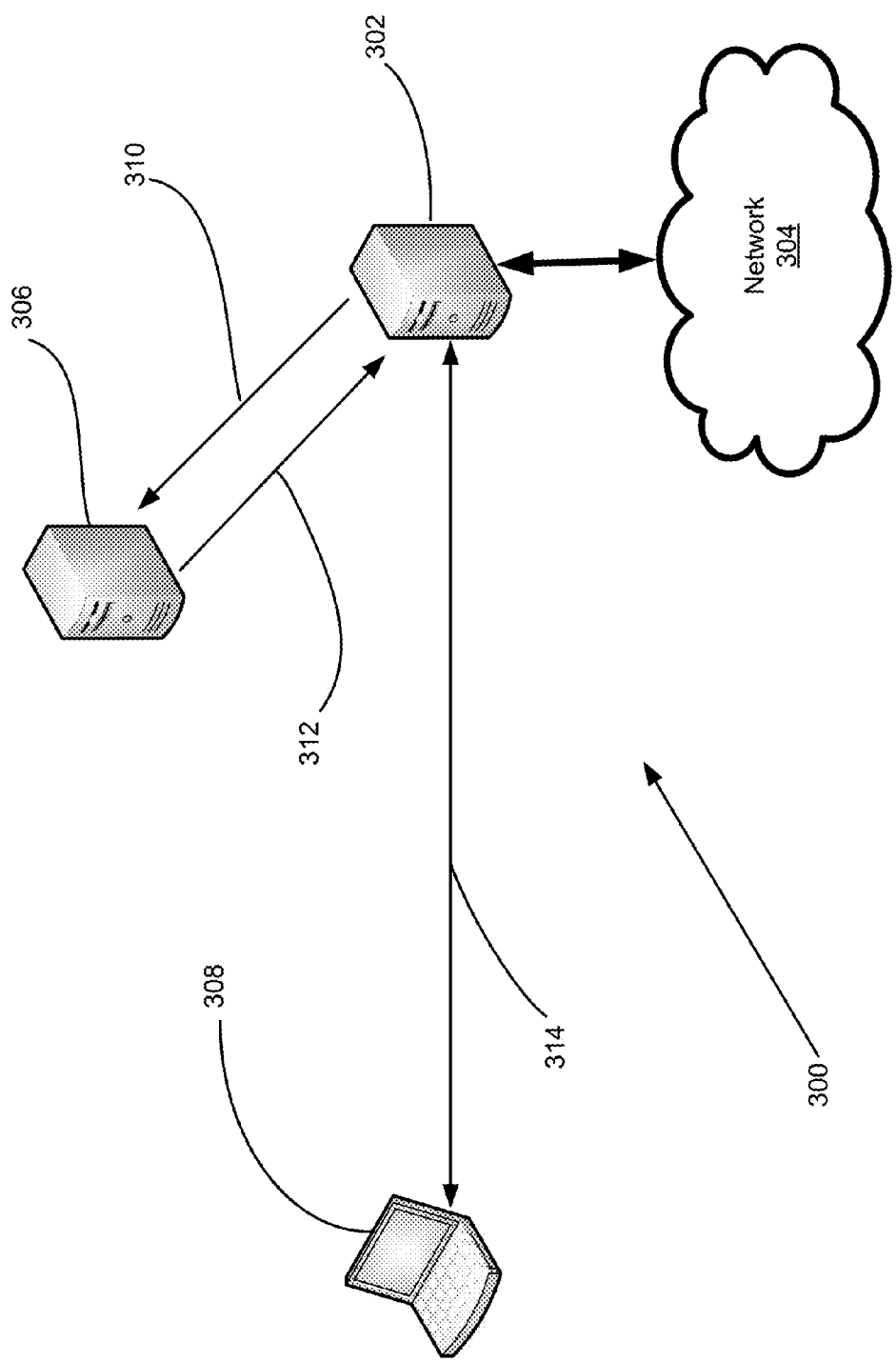
FIG. 3 illustrates an embodiment of an electronic document classification system disclosed herein.

FIG. 3 illustrates an embodiment of an electronic document management system 300 according to the teachings of the present invention. As it will be discussed in further detail below, the system 300 may be used for generation, storage, archival, retrieval, communication, classification, prioritization, deletion, and management of electronic documents. The system 300 includes a server 302 that may be communicatively connected to a network 304 to receive and communicate electronic documents. The server 302 may also be communicatively connected to an electronic document management server 306, and one or more client computers such as a client computer 308.

The server 302 may be an email server that is configured to run a mail transfer agent software to manage email or other electronic documents. As an example, the server 302 may be a Lotus Notes™ email server provided by IBM™ or a Microsoft Outlook™ email server provided by Microsoft™, etc. The server 302 may receive email and other electronic documents from the network 302 and from the client computer 308. The server 302 may also be configured to store, process and forward such document to its appropriate destination.

The network 304 may be any of the commonly used networks such as the Internet. In the context of the present invention, the term "network" includes local area networks (LANs), wide area networks (WANs), metro area networks, residential networks, corporate networks, inter-networks, the Internet, the World Wide Web, cable television systems, telephone systems, wireless telecommunications systems, fiber optic networks, token ring networks, Ethernet networks, ATM networks, frame relay networks, satellite communications systems, and the like. Such networks are well known in the art and consequently are not further described here. The network 304 may be communicatively connected to a number of other servers, databases, etc. For example, in one implementation the network 304 may be communicatively connected to one or more other message transfer agents, mail transfer agents, mail relays, etc.

In an embodiment of the system 300, the server 302 is configured to send 310 documents, such as emails, received from the network 304 to the document management server 306. The server 302 may be configured to send 310 documents to the document management server 306 via a periodic push operation or it may be configured to send 310 the email to the document management server 306 instantaneously upon receiving an email. In an alternate embodiment, the document management server 306 may be designed to perform a periodic pull operation by which it pulls a batch of emails from the server 302.

Upon receiving the emails from the server 302, the document management server 306 may process the received email and classify the email according to the method described in further detail below. In an embodiment, the document management system 300 may classify an email by determining one or more email identifying data and applying one or more classification rules to the email identifying data. Once the document management server 306 has processed the email, it may attach one or more tags or other information to the email. In an alternate embodiment, the system 300 may also attach a prioritizing tag to each of the processed emails, wherein the prioritizing tag may be determined based on the classification of the received email or based on the email identifying data. Such tags may be in the form of metadata attached to the processed email, in a separate file that is designed to be linked to the email, in a separate database file, etc. The document management server 306 may send 312 the processed email together with such tag and other identifying data back to the server 302. The document management server 306 may send 312 the tagged email by a push operation or the server 302 may pull the tagged emails by a pull operation on a periodic basis.

Once the server 302 receives the tagged email from the document management server 306, the server 302 sends 314 such tagged emails to the email client 308. In an alternate embodiment, the server 302 may send the tagging information to the client computer 308 separately from the emails. The client computer 308 may run an email client program that may be used to process the email and the tagging information received from the server 302.

Even though in the example embodiment of system 300 the client computer 308 is shown to be laptop computer, in an alternate embodiment, the client computer 308 may be also be a desktop, a personal data assistant, a cell-phone, etc. Note that even though various embodiments are discussed herein for processing incoming emails, the systems and processes described herein may also be applicable to classification of outgoing emails.

Figure 4:
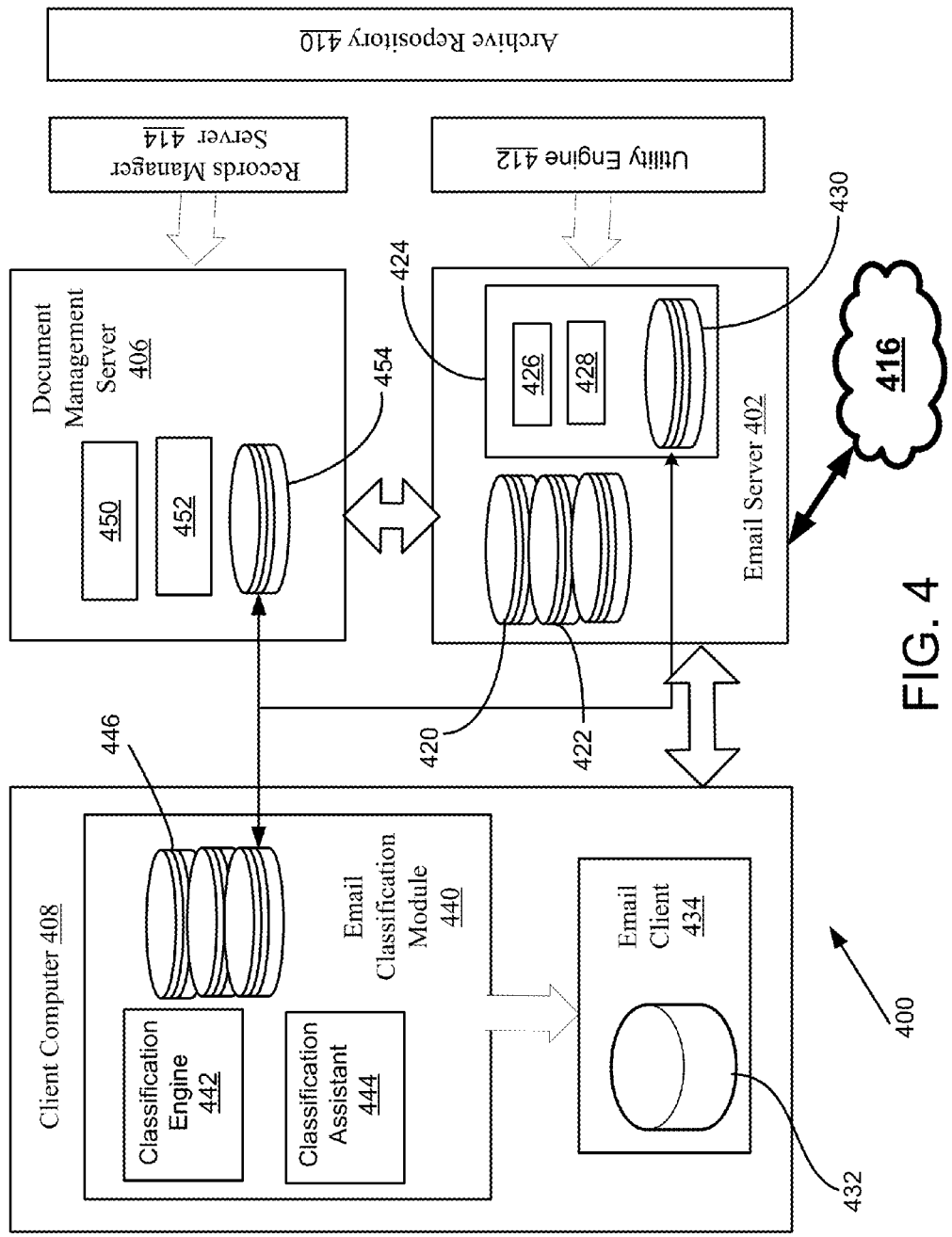
FIG. 4 illustrates an alternate embodiment of the electronic document classification system of FIG. 3.

FIG. 4 illustrates an alternate embodiment 400 of the electronic document management system 300 illustrated in FIG. 3. Specifically, FIG. 4 illustrates in further detail the architecture of the various components of the electronic document management system 300. The electronic document management system 400 includes an email server 402 communicatively connected to a document management server 406 and a client computer 408. The email server 402 may also be communicatively connected to an archive repository 410 via an archive utility engine 412. The document management server 406 may be communicatively connected to the archive repository 410 via a records manager server 414.

The archive repository 410 may be used for long term archiving of an organizations' electronic documents, including the emails. The email server 402 may receive emails from a network 416 as well as from the archive repository 410. The embodiment of the email server 402 includes a number of user email files 420, 422. Each of the user email files 420, 422 may correspond to an individual user of the electronic document management system 400. Thus, for example. User email files 420 may be files for user A while the user email files 422 may be files for user B, etc. The email server 402 also includes a control center 424 that manages various user email files 420, 422. The control center 424 may include a number of different modules performing different email management function. The embodiment of the control center 424 includes a user manger 426 that manages user accounts including adding, deleting user accounts, etc. The control center 424 also includes a knowledge base manager 428 that manages an expert knowledge base 430 of the email server 402.

The client computer 408 may include a local email database 432 of the user of the client computer 408. The client computer 408 may have an email client module 434 that is responsible for management of the local email database 432. The email client 434 may be responsible for providing a user interface to the user as well as for communicating with the email server 402. The email client 434 may also be responsible for communicating with other modules operating on the client computer 408, including an operating system module such as Linux, a data processing module such as Microsoft Office, etc.

The functioning of the email client module 434 is further enhanced by a local email classification module 440. The local email classification module 440 includes a classification engine module 442, a classification assistant module 444, and a local knowledge base 446. The classification engine module 442 uses the local knowledge base 446 to classify emails of the user of the client computer 408 according to one or more classification criteria based on the local knowledge base 446. The classification assistant module 444 may use one or more classification modules from the classification engine module 442. Accordingly, the classification assistant module 444 adapts one or more of such classification modules from the classification engine module 442 to be applied to the email documents from the local email database 432.

The local knowledge base 446 may include a personal knowledge base that is personal to the user of the client computer 408, a group knowledge base that stores collective knowledge of a group that the user belongs to and an expert knowledge base that is designed by a group of experts at the organization of the user. Various rules of such a local knowledge base 446 may be decided, at least in part, by statistical and semantic analysis of documents submitted to a user together with user responses and suggested classifications. For example, the user knowledge base may include one or more classification rules based on the email usage of the user. Thus, for example, emails that the user receives often from friends and family members, etc., are to be classified in a certain category and given a certain priority as suggested by the user's past behavior. The group knowledge base may include one or more rules that are typical of the user's department. For example, if the user is part of a human resources department, emails to the user related to hiring of personnel are classified and prioritized in a particular manner. The expert knowledge base may be generated by a group of experts of the organizations including records managers, information technology managers, etc. In an embodiment, the expert knowledge base is developed using suggestive file plan classification from expert users where the file plan is a hierarchical classification scheme used to organize electronic documents of an organization.

The document management server 406 may include one or more engines for managing the email documents, including a central classification engine 450, a central prioritization engine 452, etc. Note that while in the embodiment illustrated herein, the central classification engine 450 and the central prioritization engine 452 are illustrated as different modules, in an alternate embodiment, these modules may be combined, and as such they may be referred to herein together as the central classification engine 450. The central classification engine 450 uses a central expert knowledge base 454 that may store one or more rules for classifying and prioritizing emails.

The expert knowledge bases of the client computers 408, the document management server 406, and the email server 402 may be functionally related to each other. Thus, the central expert knowledge base 454 may be designed so that it communicates with the local knowledge base 446 on various client computers 408 on a continuous basis and it is updated on a regular basis based on information received from such local knowledge base 446. Furthermore, the central expert knowledge base 454 is also communicatively connected to the expert knowledge base 430 on the email server 402. In an embodiment of the electronic document management system 400, the various knowledge bases may be mirrored copies of each other.

In an embodiment, the expert knowledge bases may be developed by passive analysis of electronic documents of a number of users of an organization. For example, past emails of a number of experts such as document manager, information technology manager, executive officers, etc., may be analyzed to learn how a certain type of email is classified. For example, the analysis may be used to develop a rule that an email related to a major client of the organization or related to a particular subject is to be classified as having a high priority and high retention period. In an embodiment, the classification rules may be developed based on suggestive classification methodology. Such suggestive classification rules may be later applied to email identifying data generated by semantic and statistical analysis of emails.

Alternatively, the expert knowledge base may be generated by actively providing a number of emails to expert users and analyzing their feedback as to the classification, priority, and retention period of those documents. Thus, for example, the use of such experts may be monitored over a period to generate classification and prioritization rules for emails.

In an embodiment, a suggestive classification method, as discussed above, may be used to classify emails. The suggestive classification method can be utilized to identify records of the organization and properly categorize emails in the file plan. For example, an email with an executed contract attached to it would be suggested to be in the Legal\Vendor Contracts location in the file plan. Alternatively an email with an IT System project plan may be suggestively classified as a project document such as IT\Project Documents. Yet alternatively, an email from a family member may be suggestively classified as Personal information.

The central classification engine 450 may also be functionally related to the local classification engine module 442 located on the client computers 408. Thus, the central classification engine 450 may classify various email documents using the same or similar rules as used by the local classification engine module 442. In an embodiment of the electronic document management system 400, the local classification engine module 442 may be a mirrored version of the central classification engine 450 that is updated on a periodic basis. In an alternate embodiment, the local classification engine module 442 may be a version of the central classification engine 450 enhanced for use by the user of the client computer 408.

The central classification engine 450 together with the local classification engine module 442, with assistant from the classification assistant module 444, may classify emails in various categories such as auto-delete emails, transient emails, working emails, organizational records, etc. For example, the emails classified as the auto-delete emails may be designated to be systematically purged after some pre-defined retention period. An email may be categorized as transient email if it is determined that the email has only temporary value. Such a determination may be made by observing various users' past behavior or suggestions regarding certain types of emails. For example, transient emails may be those emails that are typically ignored by users or forgotten by the users. Such transient emails usually pose risk and operational inefficiencies for organizations and as such may be assigned a low retention period. A retention period may define the time for which electronic data, such as emails must be retained, must be accessible, etc., for an organization's business and legal requirements.

Another group of emails may be categorized as working emails. These are the emails that are important to the end users and to the organizations due to the need to preserve their content as a working or reference document for some period of time. While these type of emails may eventually lose their value, they may be assigned a comparatively long retention period. Yet another group of emails, which are deemed to be valuable to an organization, either by subject matter experts, by user actions, or by content analysis, may be categorized as records. Emails in this category may be assigned a long retention period according to the organization's retention schedule, sometime even indefinite retention period.

In an embodiment, the document management system disclosed herein applies a zone management approach for managing emails. Accordingly, the central classification engine 450 together with the local classification engine module 442, with assistance from the classification assistant module 444, may group emails into a one of three different zones discussed above, namely record zone, working zone, and auto-delete zone.

In one embodiment, emails for which a user takes no action to classify them (as further discussed below) may be by default considered to be in the auto-delete zone. Emails which a user needs to preserve to perform his or her job function may be classified in the working zone. Such emails classified in the working zone may be managed according to size quotas assigned to the user and the retention periods assigned to the emails. In an embodiment, when a user, or a classification engine, classifies an email as a record, such emails are flagged and captured at a central repository for retention according to the organization's corporate retention policies.

In an embodiment, the document management system 400 allows a user to keep a convenience copy of an email, which is a local copy of an organizational record type of email. In the zone management approach, such as convenience copy may also be treated as a transient of working document and may be subject to the appropriate retention and quota rules.

Figure 5:
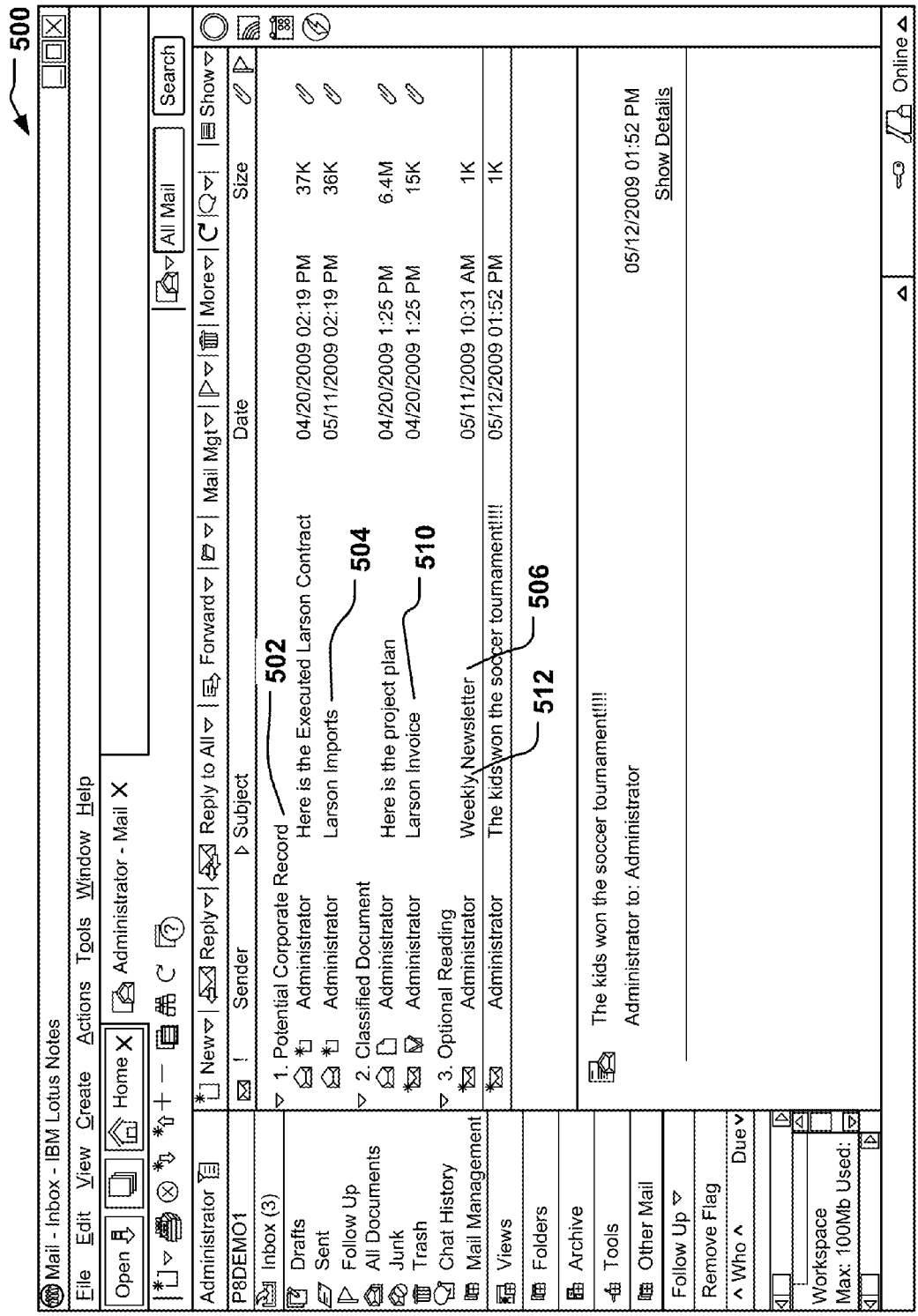
FIG. 5 illustrates an example graphical user interface output generated by the system disclosed herein.

The functioning of the electronic document management system 400 is illustrated below by various example graphical user interface (GUI) outputs. Specifically, FIG. 5 illustrates a GUI output 500 of an example user interface generated by an email client residing on client computers 106, 108, such as the email client 434. The GUI output 500 illustrates a listing of a number of user emails according to a classification method that classifies emails in the inbox of the user in three different categories. Specifically, the emails are classified into a potential corporate records category 502, a classified documents category 504, and an optional reading category 506.

While in the illustrated embodiment, the email records are classified into three different categories, alternate number of categories, may be used in other embodiments.

Similarly, the names of the categories may also be different than as provided in FIG. 5. Yet alternatively, the number of the categories and their names may be determined individually by each end user. Thus, a category of emails that one user may classify as potential corporate records may be classified by another user as high importance records.

The classification of particular emails into one of the three categories illustrated in FIG. 5 may be based on the analysis of various email identifying information as well as by the analysis of the content of an email. Thus, for example, an email 510 may be classified in a classified documents category because of the title of the email that identifies the type of that particular email as an invoice and based on a classification rule that all invoices are to be classified as classified documents. Similarly, an email 512 may be classified in the optional reading category based on application of a rule that specifies that all emails related to newsletters should be classified as optional reading.

Classification of an email in one of the categories 502, 504, 506 may also attach various characteristics to the emails therein. Thus, for example, emails classified in the optional reading category may have a characteristic of a short retention life, whereas an email classified in the potential corporate records category may have the characteristic of an unlimited retention life. The parameters attached to such characteristics may be determinably by users having different level of administrative authority. Thus, for example, an email classified as potential corporate record may not be deleted by an end user and even if it is deleted by an end user locally, a copy may always be stored in the archive repository 410. On the other hand, a user may specify that all emails in the optional reading category are automatically deleted after one week.

The central classification engine 450 may analyze an incoming email from the email server 402 to generate email identifying data. Such data can be generated from the title, content, metadata, attachments, etc., associated with the email. Subsequently, the central classification engine may apply one or more rules to the email identifying data and based on the analysis of the data and application of one or more rules stored in the central expert knowledge base 454 generate a number of tags for the incoming email. One or more of these tags may be used to classify the incoming email in one or more groups, categories 502, 504, and 506. Subsequently, the email with the tags generated by the central classification engine 450 are communicated back to the email server 402 and then onto the end client computer 408. The classification engine module 442 may allocate an email incoming to the client computer 408 by applying one or more rules stored in the local knowledge base 446. In applying the relevant rules in classifying the email, the classification engine module 442 may also use one or more of the tags generated by the central classification engine 450.

In one embodiment, the central classification engine 450 may only apply tags representing ten different levels of priority to an email, and the local classification engine module of one client computer 408 may map the top three of those priority levels to the potential corporate record category 502, the next three of those priority levels to the classified documents category 504, and the last three of the priority levels to optional reading category 506. However, a local classification engine module 442 of another client computer 408 may use different mapping.

In an alternate embodiment, the local classification engine module 442 may use the tags generated by the central classification engine 450 and map those tags to particular categories 502, 504, 506 as preferred by the end user of the client computer 408. For example, the central classification engine 450 may analyze an incoming email and classify the email as a sales agreement and the local classification engine module 442 may map all emails tagged as sales agreement in the classified document category 504.

Figure 6:
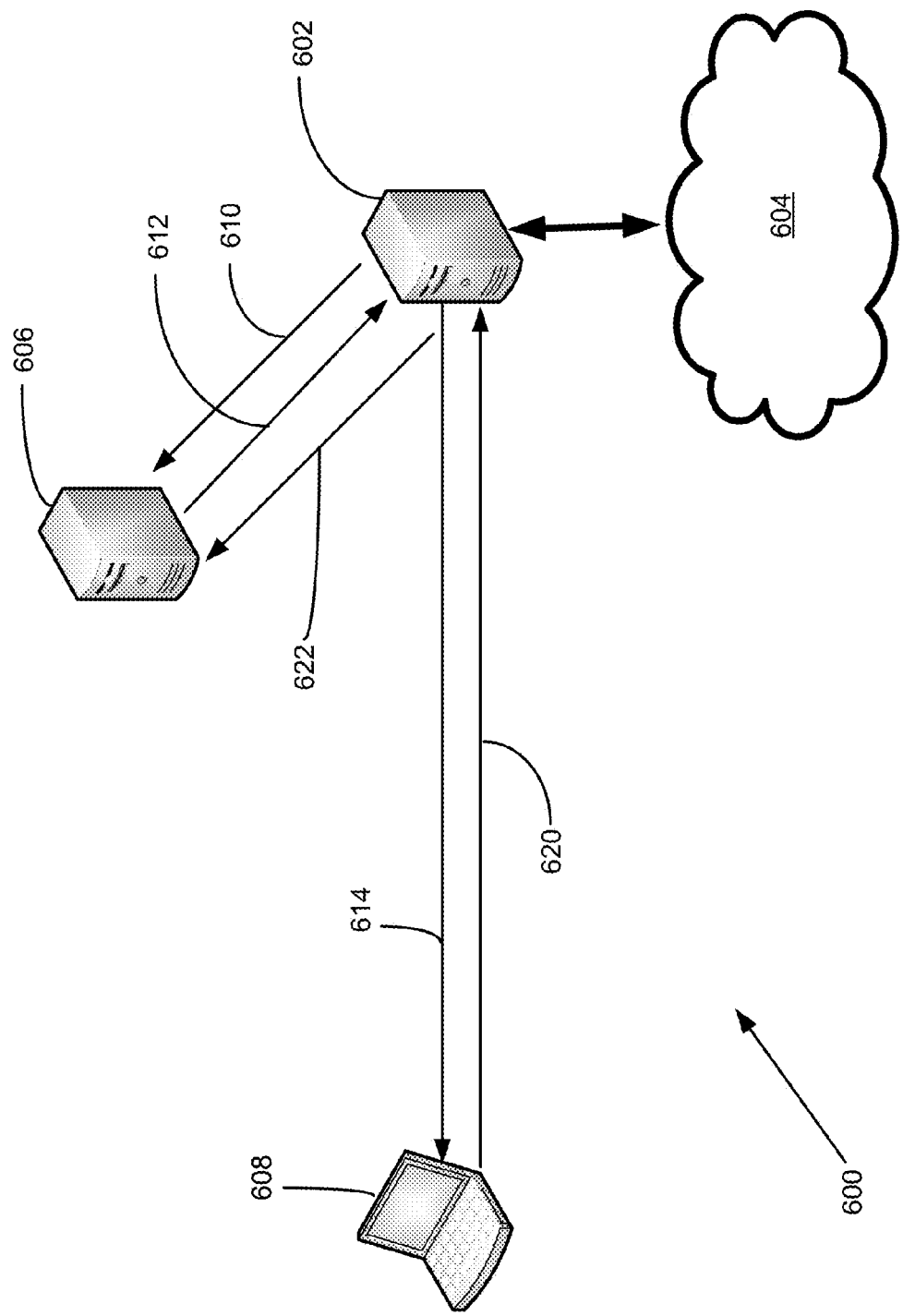
FIG. 6 illustrates an alternate embodiment of an electronic document management system disclosed herein.

FIG. 6 illustrates an alternate embodiment of an electronic document management system 600. The system 600 includes a server 602 that may be communicatively connected to a network 604 to receive and communicate electronic documents. The server 602 may also be communicatively connected to an electronic document management server 606, and one or more client computers such as a client computer 608. The functioning of the various components of system 600 may be similar to that of the various components of the system 300. Specifically, the communication between the components as illustrated by numerals 610, 612 and 614 is similar to the communication illustrated by the numerals 310, 312 and 314 in system 300. However, components of the system 600 may have one or more additional functionalities over those of the components of the system 300.

Thus, for example, upon receiving emails and the tagging information from the mail server 602, the client computer 608 displays these emails in various categories as discussed above in FIG. 5. Subsequently, a user at the client computer 608 may provide one or more suggestions to change the categorization of emails shown in FIG. 5. For example, after reviewing the inbox, the user may decide that the email 510 should be categorized in the potential corporate record category 502 and not in the classified document category 504. In one embodiment, the user may simply drag and drop the email 510 from the classified document category 504 to the potential corporate record category 502. Alternately, the user may right click on the email to open a dialog box that allows the user to re-categorize an email. In an alternate embodiment, once an email is selected by the user, the user may select an option from a drop-down box of the GUI output 500 to accomplish such re-categorization.

The local knowledge base 446 collects any and all such information generated by the user's actions or inactions, such as re-categorizing emails, receiving emails, ignoring emails, etc. The local knowledge base 446 may also update one or more rules for future email classification based on such information. Moreover, such information generated by the user's actions is sent 620 back to the email server 602. Subsequently, the email server 602 may forward 622 such information to the document management server 606. Both of the email server 602 and the document management server 606 may use such information to update their respective knowledge bases. In an alternate embodiment, various knowledge bases on the client computer 608, the email server 602, and the document management server 606 may be designed that so that they periodically share update information so that any information generated by the user's action are captured by all knowledge bases. Note that in one embodiment, one or more of the classification engine module 442 and the central classification engine 450 may decide that the user's action are not valid or may overrule user's actions. In such a case, the GUI 500 may generate an appropriate message to the user of such a decision.

Figure 7:
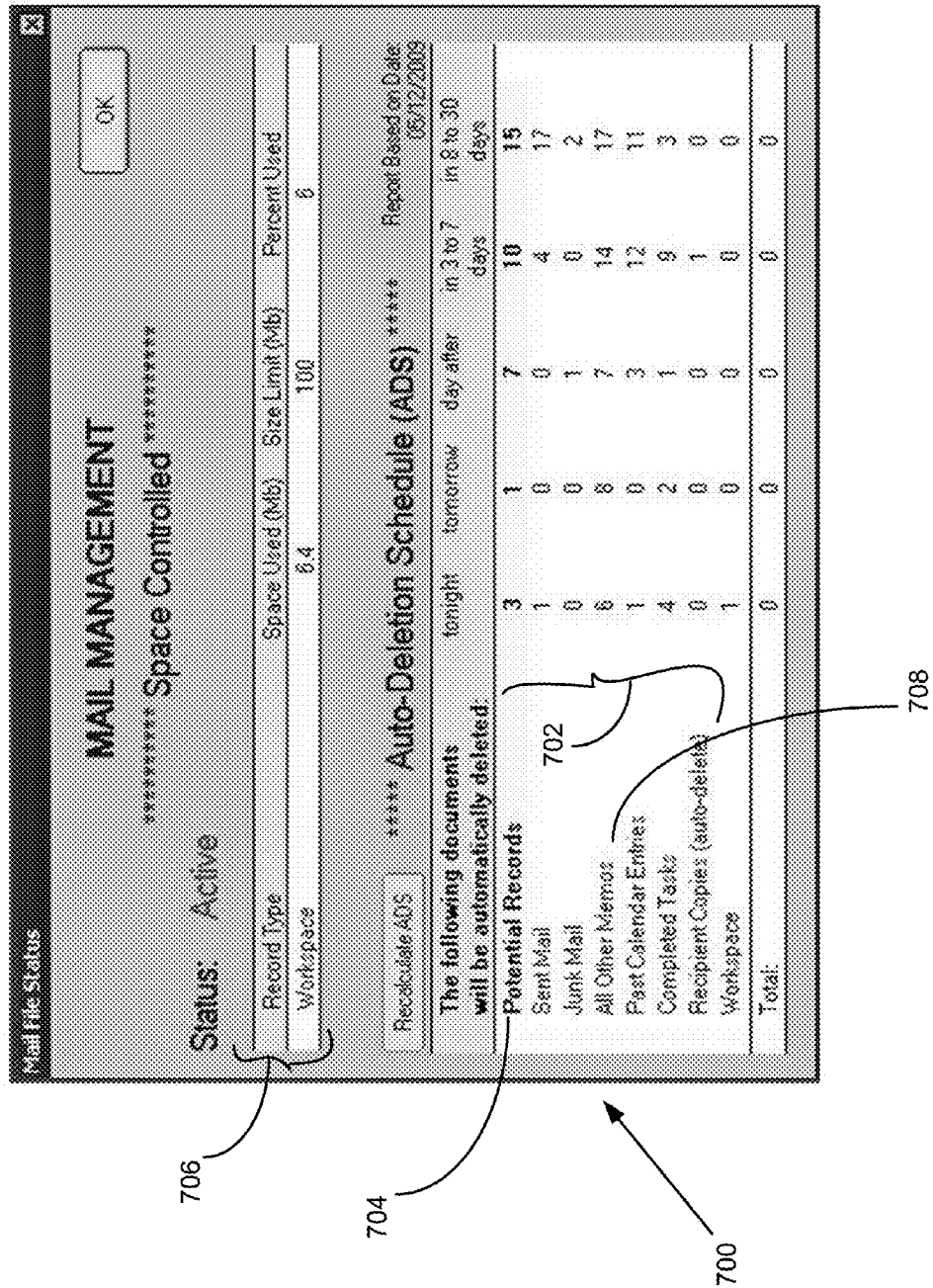
FIG. 7 illustrates an example dashboard that provides summary of a user's emails.

As the document management system disclosed herein processes various emails for a user, over time, it may accumulate a number of emails in various categories. An embodiment of the electronic document management system may also be configured periodically provide summary information to a user. FIG. 7 illustrates a dashboard 700 that provides such summary of a user's emails. Such as summary may be generated on a daily, weekly, monthly, or at any other period that may be selected by either at the system level or at the user level. In an embodiment, the dashboard 700 may be displayed to the user the first time the user opens his or her email inbox each day. Alternatively, the email user can open the dashboard 700 on demand.

Specifically, the dashboard 700 displays the number of emails that are scheduled for auto-deletion by various categories 702. In an embodiment, these categories 702 include various unclassified emails only. Other categories, such as "potential business email," etc., may also be added to the dashboard 700. Thus, for example, the dashboard suggests that there are three emails in the potential records category 704 that are scheduled for auto-deletion tonight, one email in this category is scheduled for auto-deletion tomorrow, etc. The dashboard 700 also has a workspace usage summary 706 that notifies the user as to how much space is utilized and available for further storage. The workspace usage summary 706 may be generated based on quotas assigned to an individual user for a particular zone or grouping of emails. Thus, a user may be assigned a small quota for auto-deletion group of emails, a large quota for records group of emails, etc. The workspace usage summary 706 allows the user to manage emails in each of these various groups.

Figure 8:
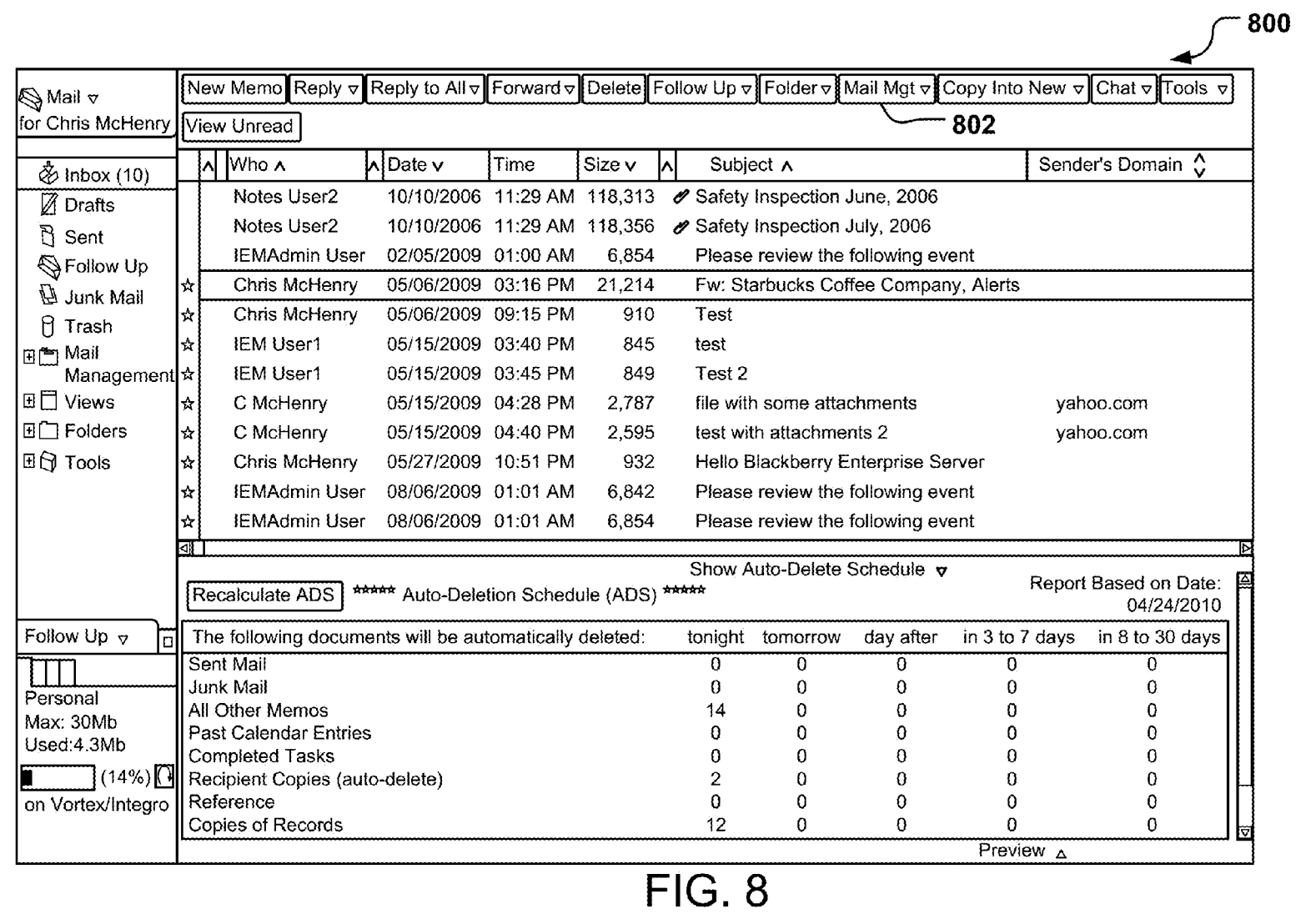

The dashboard 700 may allow a user to select one or more of the categories 702 to get further detail about the emails in the selected category. For example, a user may double-click on an all other memos category 708 to get the detailed listing of all the emails in that category. In an implementation of the document management system, such double-clicking on the all other memos category 708 opens a detailed listing 800 illustrated in FIG. 8.

Specifically, the detailed listing 800 shows that there are fourteen emails to be deleted tonight and those fourteen (only twelve shown in the window) emails are listed above. Such a detailed listing allows that user to determine if there are any emails in this category that the user wants to review, save, move to a different category, etc. The user may take such an action by selecting a particular email and right-clicking on it, by selecting a particular email and selecting an option from the options listed on top of the detailed listing 800, etc. In one embodiment, the user may select the mail management option 802 (displayed herein a "Mail Mgt").

Figure 9:
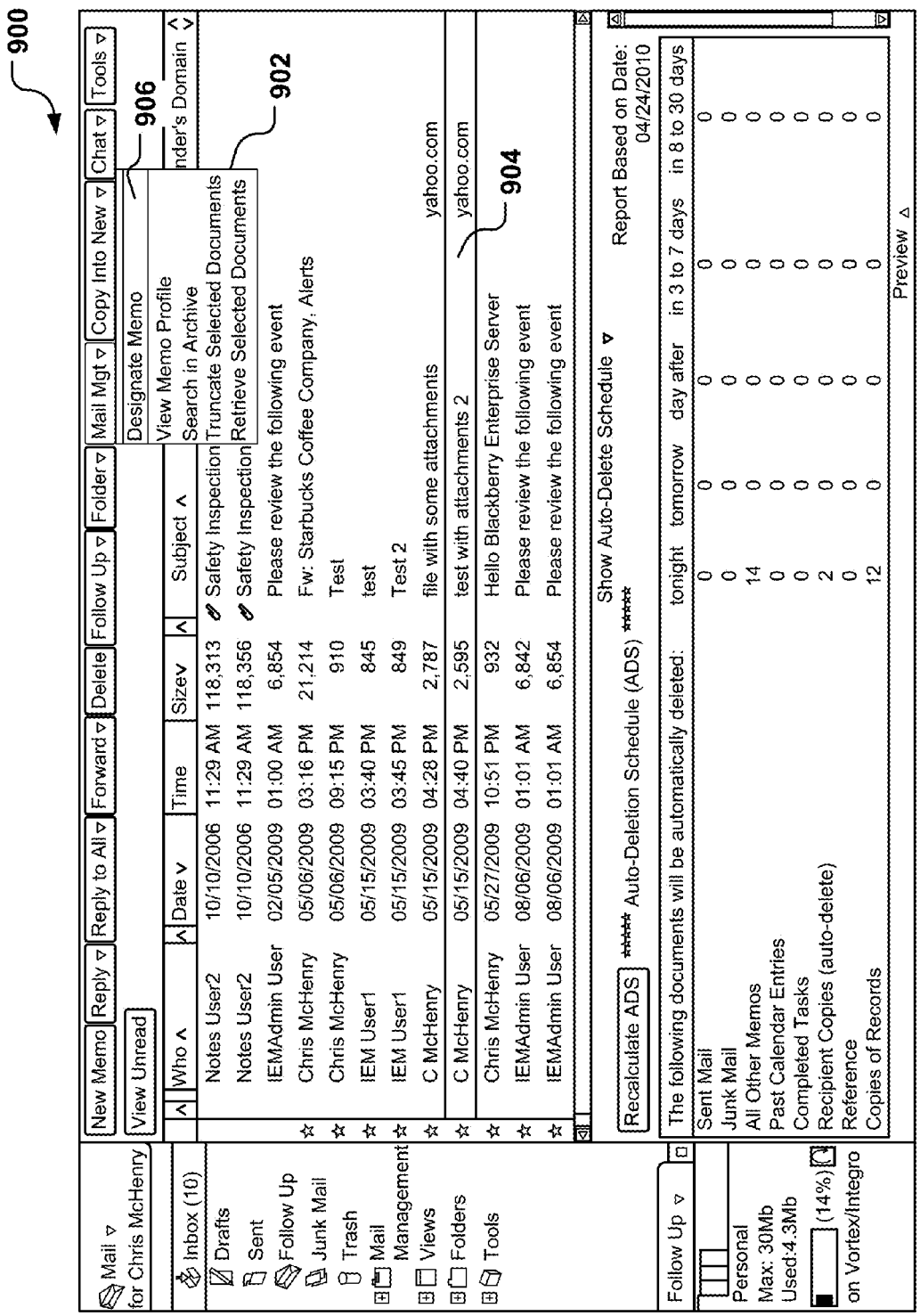

Such selection of the mail management option 802 generates a drop-down menu 902 as illustrated in the detailed listing 900 of FIG. 9. Specifically, FIG. 9 illustrates that a user has selected an email 904 for further processing, such as reclassifying, etc. In particular, the user may have decided to select a designate memo choice 906 from the drop-down menu 902. In an embodiment of the document management system, selecting the designate memo choice 906 may generate a record profile window 1000 shown in FIG. 10.

The record profile window 1000 provides various suggested categories 1002 to the user for applying to an email 1004 selected by the user. The record profile window 1000 also provides probability of the selected email being in each of the various categories 1002. For example, the record profile window 1000 suggests that there is 96% likelihood that the selected email is in a sales agreement category, 77% chance that the selected email 1004 is in a customer order files category, etc. The user may elect to apply any of the suggested categories 1002 to the selected email 1004. As discussed above, such selection by the user will be used to update the local knowledge base 446, the central knowledge base 454, etc.

Figure 11:
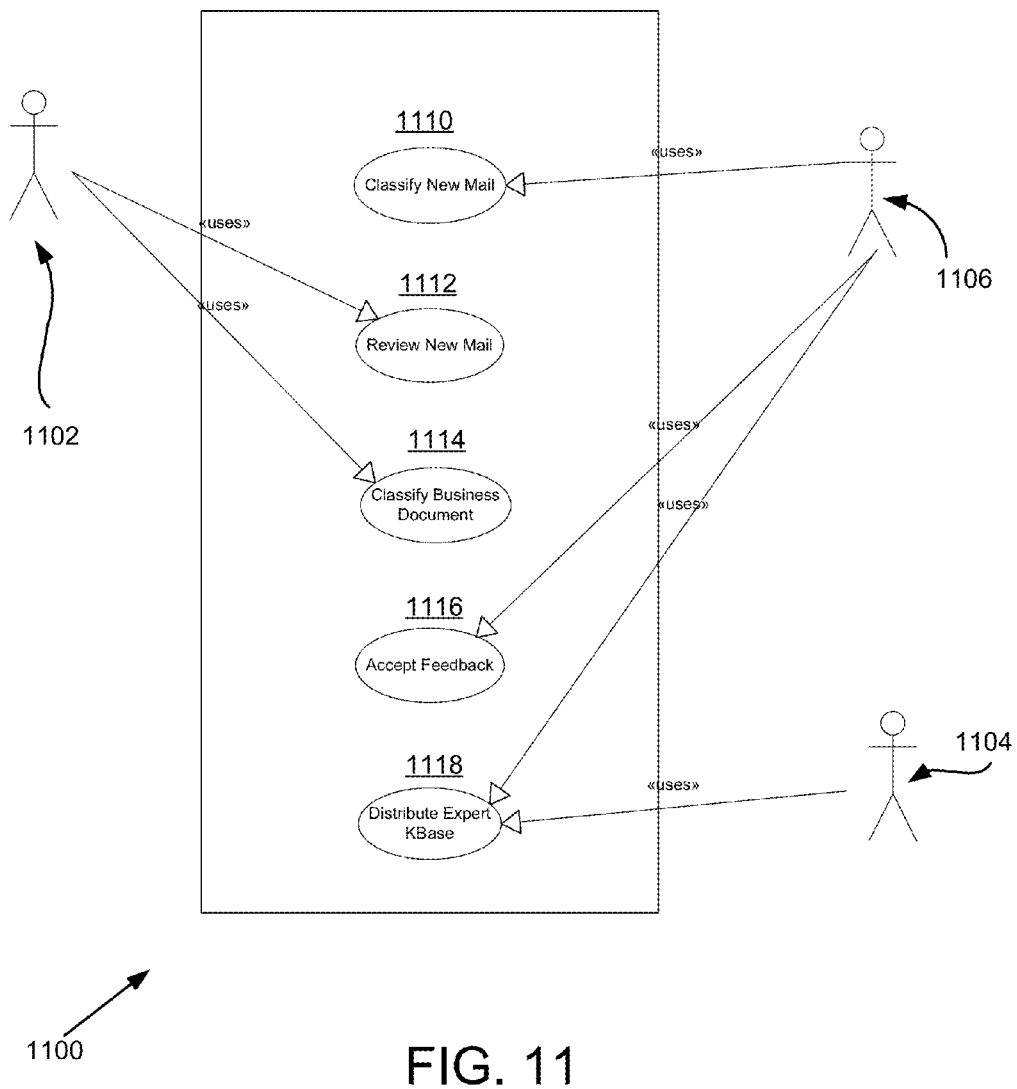
FIG. 11 illustrates an example of the functioning of the document management system disclosed herein.

Now referring to FIG. 11, a block diagram 1100 provides an alternate illustration of the functioning of the document management system disclosed herein. Specifically, the diagram 1100 illustrates the interaction of various contributors that participate in the generation of various rules in the knowledge bases 446, 432, and 454. Specifically, the document management system disclosed herein uses information received from, among others, an end user 1102, a records manager 1104, and from a classification engine 1106. The classification engine 1106 may represent, for example, the central classification engine 450, the classification engine module 442, or combination thereof.

One or more of the contributors 1102, 1104, 1106, may participate in classification of new mails 1110, in review of new emails 1112, in classifying emails that are determined to be business documents 1114, in accepting feedback 1116, and in developing a distributed expert knowledge base 1118.

The end user participant 1102 may contribute by reviewing new emails 1112 and by classifying emails determined to be business documents 1114. The email user 1102 may contribute by using their inbox, by reading emails, and by occasionally and optionally classifying emails. Thus, the document management system allows the email user 1102 to contribute while managing his or her emails as necessary to accomplish personal and organizational objectives.

On the other hand, a records manager 1104 may contribute in developing the distributed expert knowledge base 1118. The record manager 1104 is generally a domain expert in the field of records management and as such, in one embodiment, they play an important role in providing a tuned expert knowledge base as a starting point in developing appropriate classification rules of the various knowledge bases 446, 432, 454. These rules are used for initial classification of emails and for generating recommendation for the end users. The record manager 1104 may also assist in training and helping the end users as well as in back-end administration of the records lifecycle management.

Classifying a new email 1110 may involve the classification engine 1106 polling for new emails in a user's inbox, generally at the email server 402. Upon receiving a new email, the classification engine 1106 may extract textual content of the email, such as the metadata, body, attachments, etc., and present these data to a relationship classification engine. The relationship classification engine may analyze the data presented by the classification engine 1106 and based on the analysis classify the email as either a likely business document or in any other category as appropriate. Such suggested classifications may be stored with the email as tagging information.

Reviewing an email 1112 may involve an end user reviewing emails as discussed above with respect to FIGS. 5-10. As discussed above, the end user 1102 may suggest a reclassification of emails from one of the potential corporate category 502, the classified document category 504, and the optional reading category 506 to another of these categories.

The classification engine 1106 may contribute at various levels, such as by classifying new emails 1112, by accepting feedback 116, by developing the distributed expert knowledge base 1118, etc. For example, in an embodiment, the classification engine 1106 may use natural language processing and semantic analysis of a relationship modeling engine to provide suggestive classification. A series of concepts are associated with a particular classification. For instance a "Services Contract" classification may have the concepts of "contract", "services", "agreement", "master", "engagement", "scope", "methods", "termination", etc. The classification engine module 442 may extract these particular concepts from a specific document and performs pattern matching with the concepts identified in the knowledge base in order to determine the best classification for the particular document instance. In one embodiment, such classification may be limited only to emails that are determined to be prospective business records or important business documents. The classification engine 1106 not only suggests classification, but it also permits users to override suggestions, thus learning from false positive classifications as well as from positive suggestions.

Figure 10:
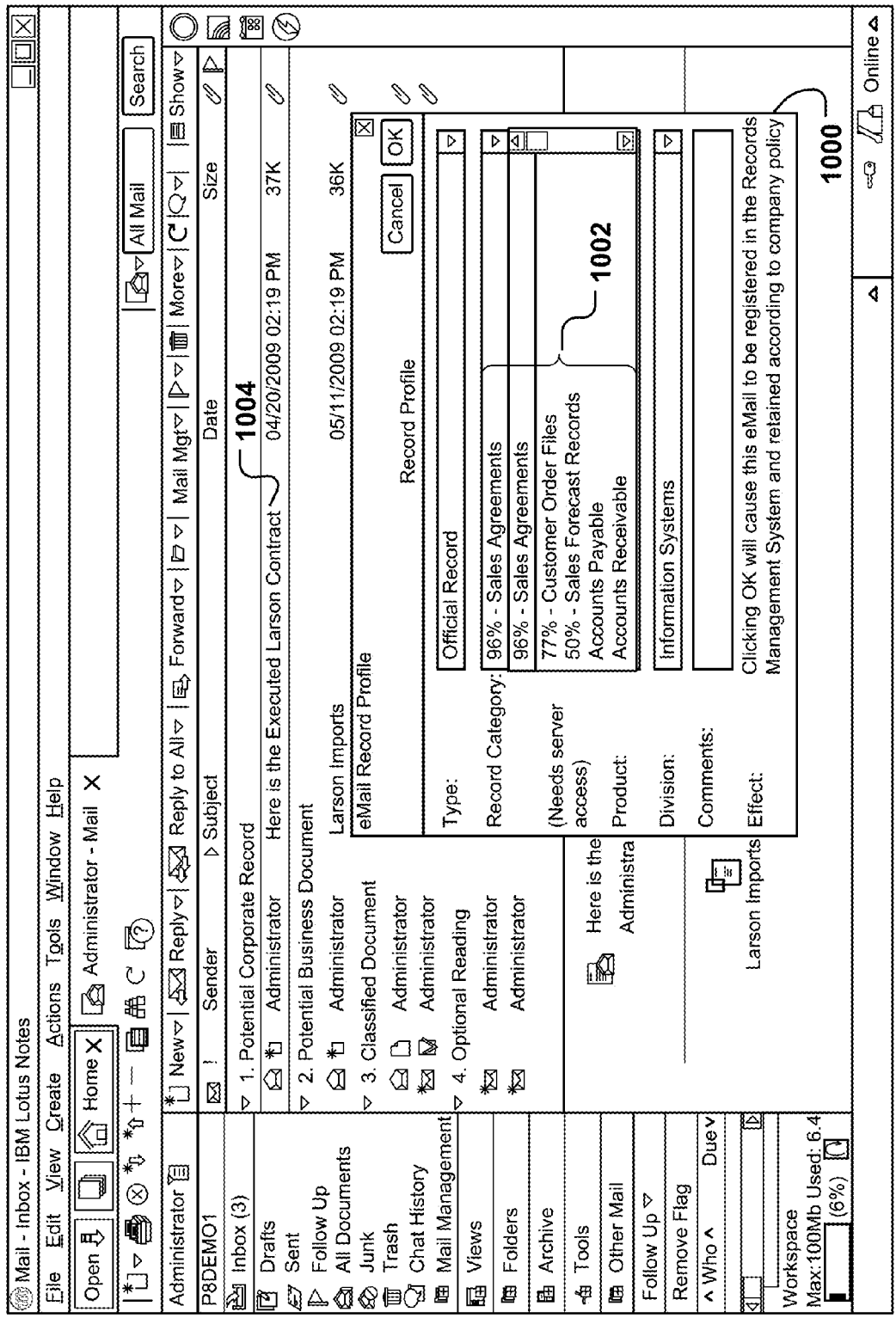
Figure 12:
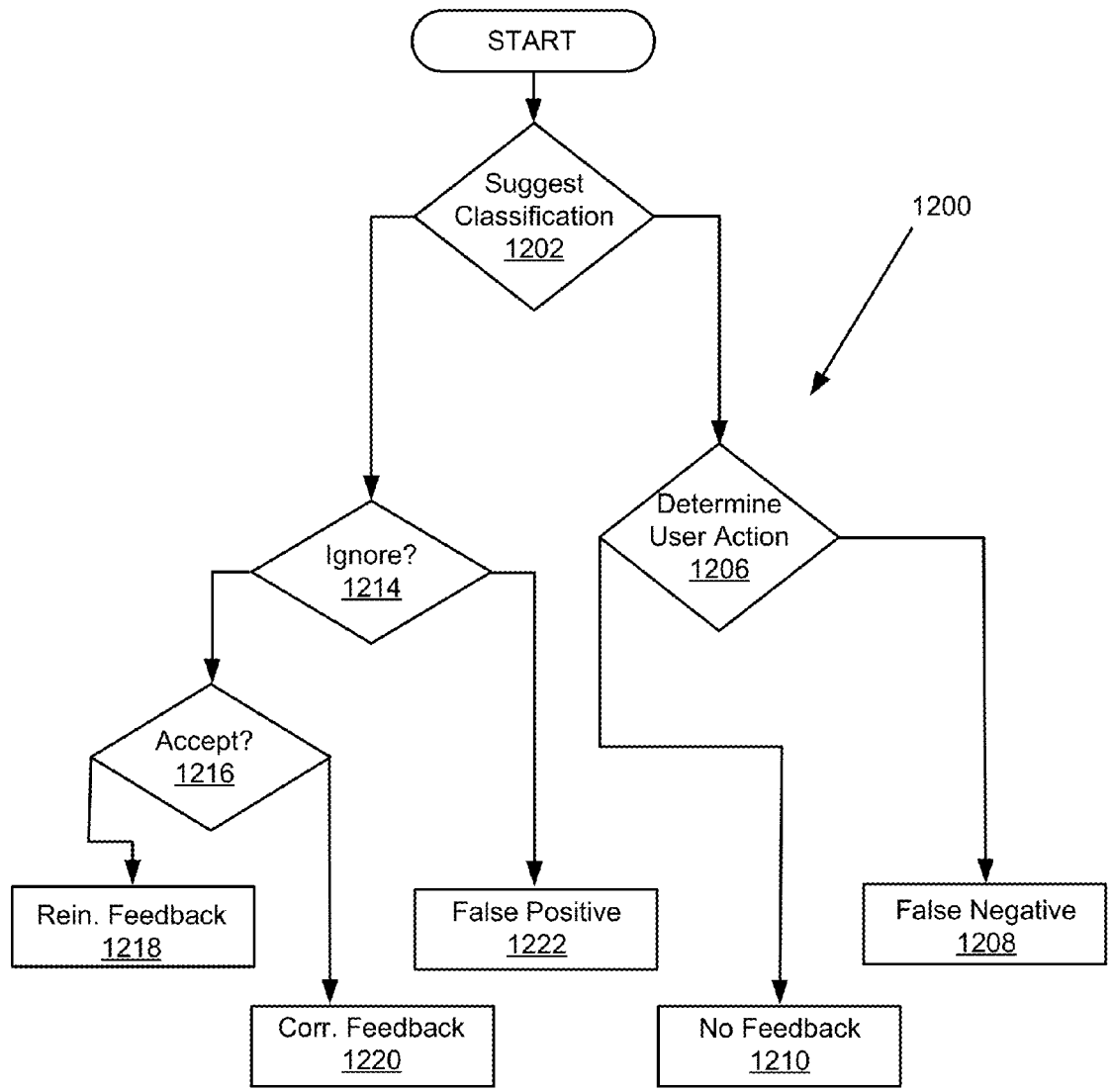
FIG. 12 illustrates example processing of a user's actions regarding reclassifying an email.

An activity diagram 1200 of FIG. 12 illustrates the processing of a user's actions regarding reclassifying an email that was initially classified as a business document. As an example, a user may suggest such reclassification by selecting one of the record categories 1002 as illustrated in FIG. 10. A processing step 1202 determines if the classification engine 1106 had initially suggested a classification for an email. If a classification was not suggested, a processing step 1206 determines the action taken by the user 1102 when reviewing this email. If the user 1102 has classified such an email that was not initially classified by the classification engine 1106, that email is flagged with a tag suggesting "false negative" 1208 and sent to the classification engine 1106 for further processing. However, if the processing step 1206 determines that the user 1102 has ignored or not classified such an unclassified email, that email is flagged with a tag suggesting "no feedback" 1210 and sent to the classification engine 1106 for further processing.

If the processing step 1202 determines the classification engine 1106 had initially suggested a classification for an email, a processing step 1214 determines if the user 1102 decided to ignore the email or to review it. Upon determination that the user 1102 had reviewed the email, a processing step 1216 determines if the user accepted the classification suggested by the classification engine 1106 or decided to override the classification suggested by the classification engine 1106. If it is determined that the user accepted the classification suggestion, that email is flagged with a tag suggesting "reinforcing feedback" 1218 and sent to the classification engine 1106 for further processing. On the other hand, if the user decided to override the classification suggestion, that email is flagged with a tag suggesting "corrective feedback" 1220 and sent to the classification engine 1106 for further processing.

Finally, if the processing step 1214 determines that user 1102 rejected or ignored the classification that was initially suggested by the classification engine 1106, that email is flagged with a tag suggesting "false positive" 1222 and sent to the classification engine 1106 for further processing. The classification engine 1106 may use the tags 1208, 1210, 1218, 1220, 1222, and process them to redefine the rules for classifying emails. Such rules may be stored in the various knowledge bases 446, 454, and 430.

Figure 13:
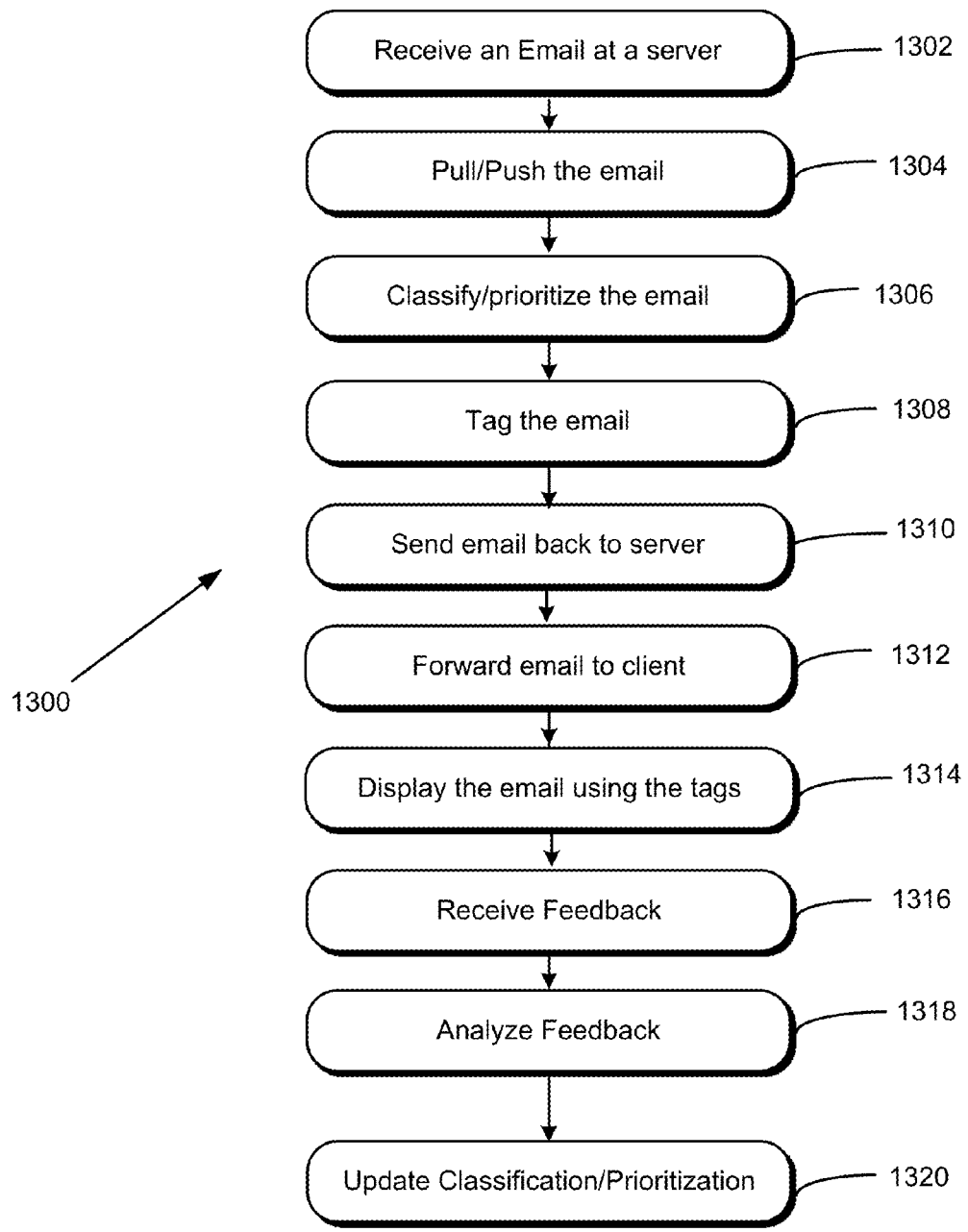
FIG. 13 illustrates a flowchart of the processing of emails by the electronic document management system described herein.

Now referring to FIG. 13, a flowchart 1300 illustrates the processing of emails or other electronic documents by an embodiment of the electronic document management system described herein. Note that while the flowchart 1300 illustrates the processing in view of the electronic document management system 400 described above in FIG. 4, the process may also be applicable, with a few variations to the other electronic document management systems 300 and 600 described herein. At a processing step 1302, the email server 402 receives an email. The email server 402 may receive the email from the network 416, etc. Upon receiving the email, at a processing step 1304, the email server 402 pushes the email to the document management server 406. Note that in an alternate embodiment, at the processing step 1304, the document management server 406 may pull the emails received at the email server 402 on a regular basis.

The document management server 406 processes the email at step 1306 to classify and/or prioritize the email into one or more predetermined groups. For example, such classification and prioritization may be done by the central classification engine 450 and the central prioritization engine 452 using the central knowledge base 454. At the processing step 1308, tags are generated for the processed email that identifies the category, grouping, priority, etc., of the email. The processed email with the tags is sent back to the email server 402 at a processing step 1310.

At a processing step 1312, the email server 402 may instantaneously, or on a periodic basis, forward the tagged emails received from the document management server 406 to the client 408. The classification engine module 442 together with the classification assistant module 444 may work with the email client 434 on the client computer 408 to display the email in an enhanced manner at a processing step 1314. An example of such an enhanced display is shown in the output GUI 500 of FIG. 5.

At a processing step 1316, one or more user feedbacks are collected from the user. Note that such feedbacks are not always provided in an active manner by the user. For example, an example active feedback may be reclassifying an email displayed by the GUI 500. On the other hand, an example of a passive feedback by a user may be the user not reviewing an email at all. A processing step 1318 analyzes such feedback from the user, such as for example, in a manner suggested by the activity diagram 1200 of FIG. 12. The tags are sent to the classification engine 1106 so that it may, at a processing step 1320 update various rules for classifying emails. Note that based on the tag received, the classification engine 1106 may decide to update or not to update the rules. Such updated rules are periodically shared among all knowledge bases.

Figure 14:
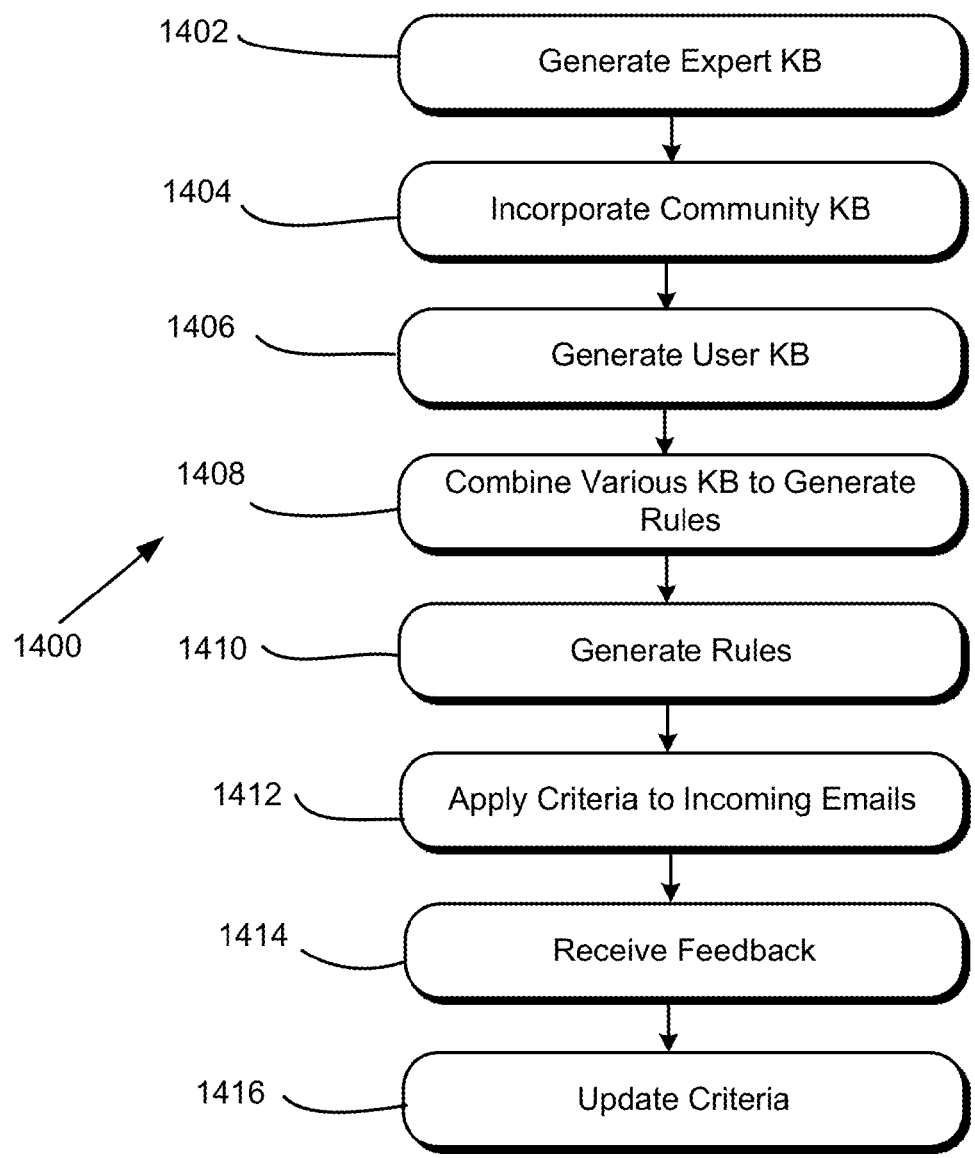
FIG. 14 illustrates generating and updating one or more of the expert databases used by the electronic document management system described herein.

Now referring to FIG. 14, a flowchart 1400 illustrates generating and updating one or more of the expert databases used by the electronic document management system 400. Note that while the flowchart 1400 illustrates the processing in view of the electronic document management system 400 described above in FIG. 4, the process may also be applicable, with a few variations to the other electronic document management systems 300 and 600 described herein. At a processing step 1402, the system 400 generates an expert knowledge base. Generating an expert knowledge base may involve actively providing a number of emails to a group of domain experts, record managers, etc., or simply analyzing a set of prior emails of the group of domain experts, record managers, etc. The expert knowledge base may be stored at the document management server 406.

At a processing step 1404, the system 400 may enhance the expert knowledge base by incorporating a community knowledge base. For example, a community knowledge base may be developed over time based on usage by a number of users in the same industry. Thus, for example, when implementing the system 400 for a law-firm, a community knowledge base that is based on the usage by a number of legal professional may be used to enhance the expert knowledge base. Alternatively, a community knowledge base that is developed based on usage of standard legal terminology may be used to enhance the expert knowledge base.

At processing step 1406, the system 400 may also generate a user knowledge base that is based on the use of the emails by an individual user. Such a user knowledge base, such as the local knowledge base 446, may be stored on the computer of the user, such as the client computer 408. The processing step 1408 for combining various expert knowledge bases may be undertaken periodically or on an instantaneous manner. In an example, where at least part of the various knowledge bases are maintained in a mirrored fashion, combining these knowledge bases may be instantaneous.

The knowledge bases, either on individual bases or in a combined fashion, may be used at a processing step 1410 to generate one or more email processing and tagging rules or criteria. At a processing step 1412 such rules and/or are applied to the incoming mail to classify the incoming mail into various groups, categories, priorities, etc. At a processing step 1414 feedback is received from the users and at a processing step 1416, such feedback is used to update the knowledge bases as well as the rules developed therefrom.

Figure 15:
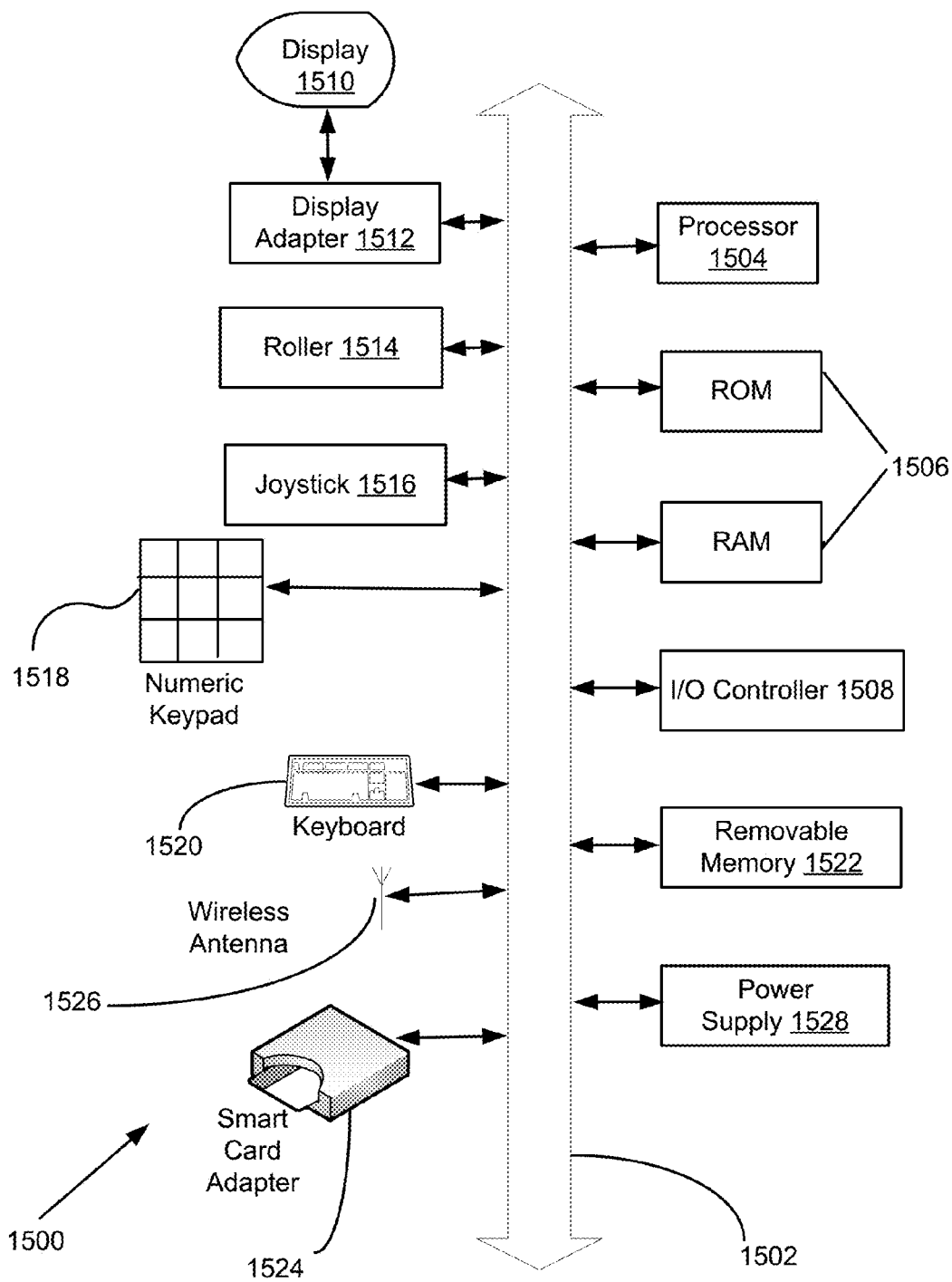
FIG. 15 illustrates a block diagram of a computer system suitable for implementing aspects of the present invention.

FIG. 15 discloses a block diagram of a computer system 1500 suitable for implementing aspects of the present invention. The computer system 1500 may be used to implement one or more components of the document management system disclosed herein.

For example, in one embodiment of the document management system 400, the computer system 1500 may be used to implement each of the server 402, the client computer 408, and the document management server 406. As shown in FIG. 7, system 1500 includes a bus 1502 which interconnects major subsystems such as a processor 1504, an internal memory 1506 (such as a RAM or ROM), an input/output (I/O) controller 1508, a removable memory (such as a memory card) 1522, an external device such as a display screen 1510 via a display adapter 1512, a roller-type input device 1514, a joystick 1516, a numeric keyboard 1518, an alphanumeric keyboard 1520, smart card acceptance device 1524, a wireless interface 1526, and a power supply 1528. Many other devices can be connected. Wireless interface 1526 together with a wired network interface (not shown), may be used to interface to a local or wide area network (such as the Internet) using any network interface system known to those skilled in the art.

Many other devices or subsystems (not shown) may be connected in a similar manner. Also, it is not necessary for all of the devices shown in FIG. 15 to be present to practice the present invention. Furthermore, the devices and subsystems may be interconnected in different ways from that shown in FIG. 15. Code to implement the present invention may be operably disposed in the internal memory 1506 or stored on storage media such as the removable memory 1522, a floppy disk, a thumb drive, a CompactFlash® storage device, a DVD-R ("Digital Versatile Disc" or "Digital Video Disc" recordable), a DVD-ROM ("Digital Versatile Disc" or "Digital Video Disc" read-only memory), a CD-R (Compact Disc-Recordable), or a CD-ROM (Compact Disc read-only memory). For example, in an embodiment of the computer system 1500, code for implementing the classification system described in FIG. 13 may be stored in the internal memory 1506 and configured to be operated by the processor 1504.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method comprising:
analyzing an electronic document to generate document identifying data;
classifying the electronic document in one or more display categories by applying a classification rule to the document identifying data, wherein the classification of the electronic document represents a prioritization of the electronic document;
displaying the classified electronic document in the one of the one or more display categories in which it was classified;
receiving a user feedback regarding prioritization of the electronic document; and
updating the classification rule based on the feedback from the user,
wherein analyzing the electronic document further comprises analyzing the document using semantical analysis of the document comprising,
associating one or more concepts with one or more display categories,
extracting the one or more concepts from the electronic document, and
pattern matching the one or more extracted concepts with the one or more concepts associated with the one or more display categories.

2. The method of claim 1, wherein the user feedback is in a form of the user moving the electronic document from the one of the one or more display categories to another of the one or more display categories.

3. The method of claim 1, wherein the user feedback is in a form of the user not reviewing the electronic document.

4. The method of claim 1, wherein the electronic document is an email and wherein displaying the classified electronic document further comprises displaying the classified electronic document in an email inbox of the user.

5. The method of claim 1, wherein the user feedback is an override of the classification based on the classification rule.

6. The method of claim 5, further comprising:
updating the classification rule in response to the user override feedback.

7. The method of claim 1, further comprising:
updating the classification rule based on analysis of electronic documents by an end user.

8. The method of claim 1, wherein classifying the electronic document further comprises:
using semantic analysis to provide suggestive classification for the electronic document; and
allowing the user to select one of the suggestive classification, wherein updating the classification rule further comprises updating the classification rule based on the selection of the suggestive classification.

9. The method of claim 1, wherein analyzing the electronic document includes analyzing at least one of (i) an electronic document recipient's address, (ii) metadata attached to the electronic document, (iii) a title of the electronic document, (iv) content attached to the electronic document, and (v) content of the electronic document.

10. The method of claim 1, further comprising:
prioritizing the electronic document based on the document identifying data.

11. The method of claim 1, further comprising:
prioritizing the electronic document based on the display category of the document.

12. The method of claim 1, wherein the electronic document identifying data includes a confidence level representative of a priority level of the electronic document.

13. The method of claim 1, further comprising:
assigning a retention level to the electronic document based on the classification of the electronic document.

14. The method of claim 1, further comprising:
assigning an auto-deletion time to the electronic document based on the classification of the electronic document.

15. The method of claim 14, further comprising:
determining, on a periodic basis, if the electronic document is to be deleted and providing a message to a user if the electronic document is to be deleted.

16. The method of claim 1, further comprising:
modifying a classification rule based on a feedback of a recipient of the electronic document and a collective knowledge base of an organization, wherein the recipient is a member of the organization.

17. The method of claim 16, further comprising:
developing the classification rule based on a community knowledge base, wherein the organization is related to the community.

18. The method of claim 1, wherein classifying the electronic document further comprises classifying the electronic document in one of (i) a potential corporate record category; (ii) a classified document category; and (iii) an optional reading category.

19. The method of claim 1, further comprising:
assigning workspace quota to each of the one or more display categories.

20. The method of claim 1, wherein receiving the user feedback further comprises receiving a request to use the user selected classification to update a suggestive classification modeling engine.

21. The method of claim 20, wherein receiving the user feedback from a user further comprises the user ignoring the electronic document.

22. The method of claim 1, wherein the user feedback comprises the user reclassifying the electronic document to a junk category of the one or more display categories, the method further comprising:
assigning an auto-deletion time based on the junk category classification.

23. One or more non-transitory computer-readable storage media encoding computer-executable instructions for executing on one or more computer systems a computer process for classifying electronic documents, the computer process comprising:
analyzing an electronic document to generate document identifying data;
classifying the electronic document in one of one or more categories by applying a suggestive classification rule to the document identifying data, wherein the classification of the electronic document represents a prioritization of the electronic document;
receiving an input from a user reclassifying the electronic document into another of the one or more categories, wherein the user feedback is in a form of the user moving the electronic document from the one of the one or more categories to the another of the one or more categories;
updating the classification rule based on the input from a user;
assigning an auto-deletion period to the electronic document based on the document identifying data; and
deleting the electronic document when the auto-deletion period has expired.

24. The computer-readable storage media of claim 23, wherein the computer process further comprises displaying the classified electronic document in the one or more categories.

25. The computer-readable storage media of claim 23, wherein analyzing the electronic document further comprises analyzing metadata attached to the electronic document.

26. The computer-readable storage media of claim 23, wherein classifying the electronic document further comprises:
  associating a series of concepts to the electronic document; and
  pattern matching the concepts associated with the electronic document with concepts identified in a knowledge base.

27. The computer-readable storage media of claim 23, wherein the received user input comprises the user reclassifying the electronic document to a junk category of the one or more categories, the computer process further comprising:
  deleting the electronic document upon expiration of an assigned an auto-deletion time, the auto deletion time being based on the junk category classification.

28. A method comprising:
  analyzing an electronic document to generate document identifying data by pattern matching one or more concepts extracted from the electronic document with one or more concepts associated with one or more categories;
  classifying the electronic document in the one or more categories by applying a classification rule to the document identifying data;
  causing the classified electronic document to be displayed in the one or more categories;
  updating the classification rule based on input received from a user; and
  assigning an auto-deletion time to the electronic document based on the updated classification rule.

29. The method of claim 28 wherein the input received from the user comprises information indicating the user has reclassified the electronic document to a junk category of the one or more categories, the auto-deletion time being based on the junk category classification.

* * * * *